(12) United States Patent
Laux et al.

(10) Patent No.: US 7,207,044 B2
(45) Date of Patent: Apr. 17, 2007

(54) METHODS AND SYSTEMS FOR INTEGRATING WITH LOAD BALANCERS IN A CLIENT AND SERVER SYSTEM

(75) Inventors: Thorsten O. Laux, Mountain View, CA (US); Dennis Chernolvanov, Hamburg (DE); Thomas Pfohe, Hamburg (DE)

(73) Assignee: Sun Microsystems, Inc., Menlo Park, CA (US)

( * ) Notice: Subject to any disclaimer, the term of this patent is extended or adjusted under 35 U.S.C. 154(b) by 717 days.

(21) Appl. No.: 10/301,293

(22) Filed: Nov. 21, 2002

(65) Prior Publication Data

US 2003/0097405 A1 May 22, 2003

(30) Foreign Application Priority Data

Nov. 21, 2001 (EP) ................................. 01127748

(51) Int. Cl.
*G06F 9/46* (2006.01)
(52) U.S. Cl. .................... 718/105; 709/203; 709/230
(58) Field of Classification Search ................ 709/203, 709/230; 718/105; 455/453
See application file for complete search history.

(56) References Cited

U.S. PATENT DOCUMENTS 5,774,660 A * 6/1998 Brendel et al. ............ 709/201
6,175,869 B1 * 1/2001 Ahuja et al. ................ 709/226
6,470,389 B1 * 10/2002 Chung et al. ............... 709/227
6,643,357 B2 * 11/2003 Lumsden .................. 379/88.22

(Continued)

FOREIGN PATENT DOCUMENTS

EP 1049307 11/2000

(Continued)

OTHER PUBLICATIONS

Anerousis, N., et al.: "Service Level Routing on the Internet"; Global Telecommunications Conference Globecomm '99, IEEE, 1999, pp. 553-559, XP010373614 Rio de Janero, Brasil.

(Continued)

*Primary Examiner*—Saleh Najjar
*Assistant Examiner*—Thuong T. Nguyen
(74) *Attorney, Agent, or Firm*—Sonnenschein, Nath & Rosenthal, LLP

(57) ABSTRACT

Methods, systems, and articles of manufacture consistent with the present invention provide for exchanging messages directly between a client and a selected server regardless of the use of a load balancer. The client generates a message to bypass performing load balancing functionality at the load balancer, and sends the message to the load balancer. The load balancing functionality is bypassed and the message is sent directly to the selected server by the load balancer.

41 Claims, 15 Drawing Sheets

U.S. PATENT DOCUMENTS

| | | | |
|---|---|---|---|
| 6,671,259 B1* | 12/2003 | He et al. | 370/238 |
| 6,772,333 B1* | 8/2004 | Brendel | 713/153 |
| 6,779,017 B1* | 8/2004 | Lamberton et al. | 709/203 |
| 6,931,428 B2* | 8/2005 | Peddu et al. | 709/203 |
| 2002/0120743 A1* | 8/2002 | Shabtay et al. | 709/226 |
| 2002/0174034 A1* | 11/2002 | Au et al. | 705/27 |
| 2002/0188862 A1* | 12/2002 | Trethewey et al. | 713/201 |
| 2003/0056002 A1* | 3/2003 | Trethewey | 709/238 |
| 2003/0074467 A1* | 4/2003 | Oblak et al. | 709/238 |
| 2003/0097405 A1* | 5/2003 | Laux et al. | 709/203 |
| 2005/0021848 A1* | 1/2005 | Jorgenson | 709/238 |

FOREIGN PATENT DOCUMENTS

| | | |
|---|---|---|
| WO | 0118641 | 3/2001 |

OTHER PUBLICATIONS

Chu-Sing Yang, et al.: "An effective mechanism for supporting content-based routing in scalable Web server clusters", Parallel Processing, 1999. Proceedings. 1999 International Workshops on Aizu-Wakamatsu, Japan, Sep. 21-24, 1999, Los Alamitos, CA, USA, IEEE, US Sep. 21, 1999, pp. 240-245, XP0103356089.

* cited by examiner

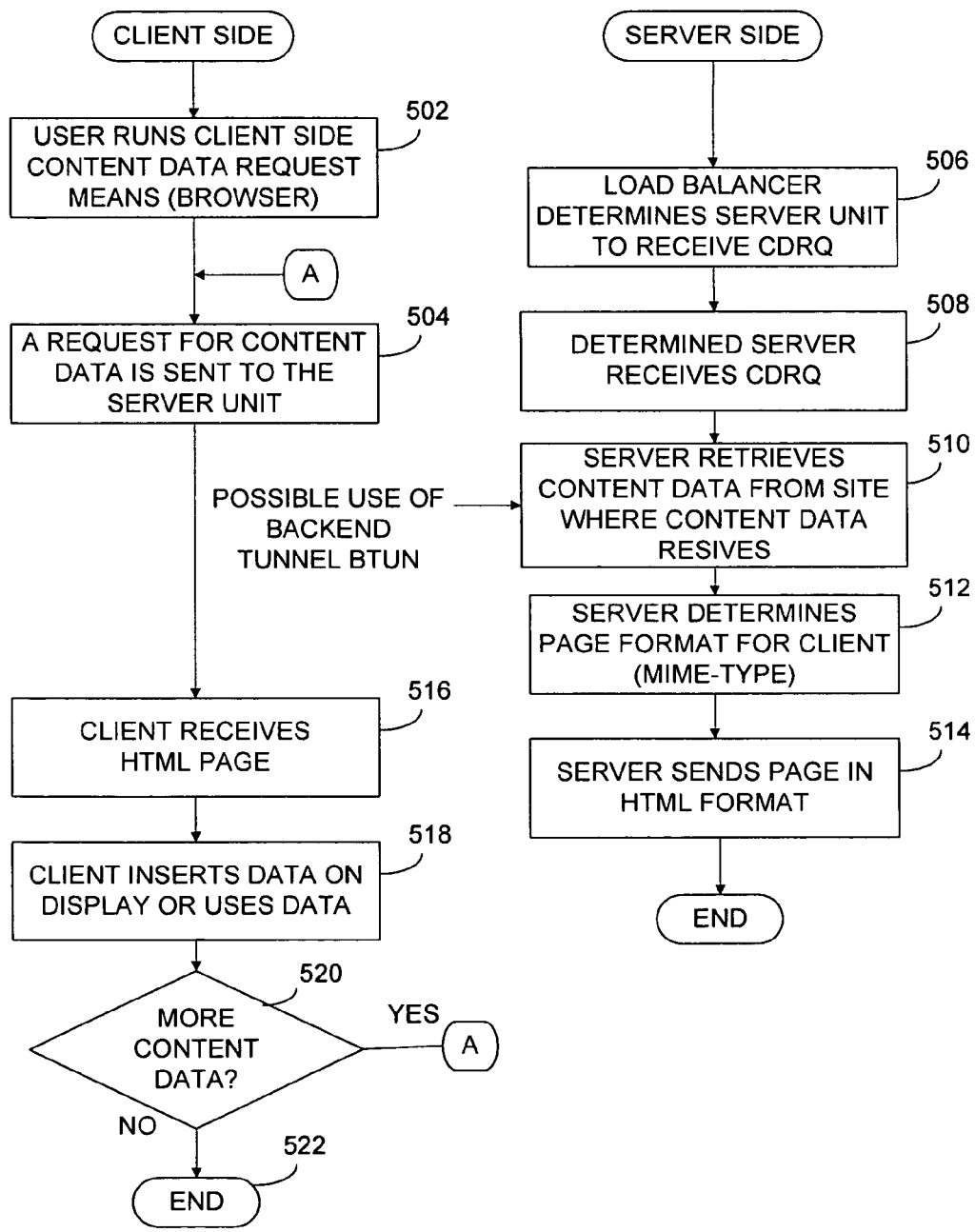

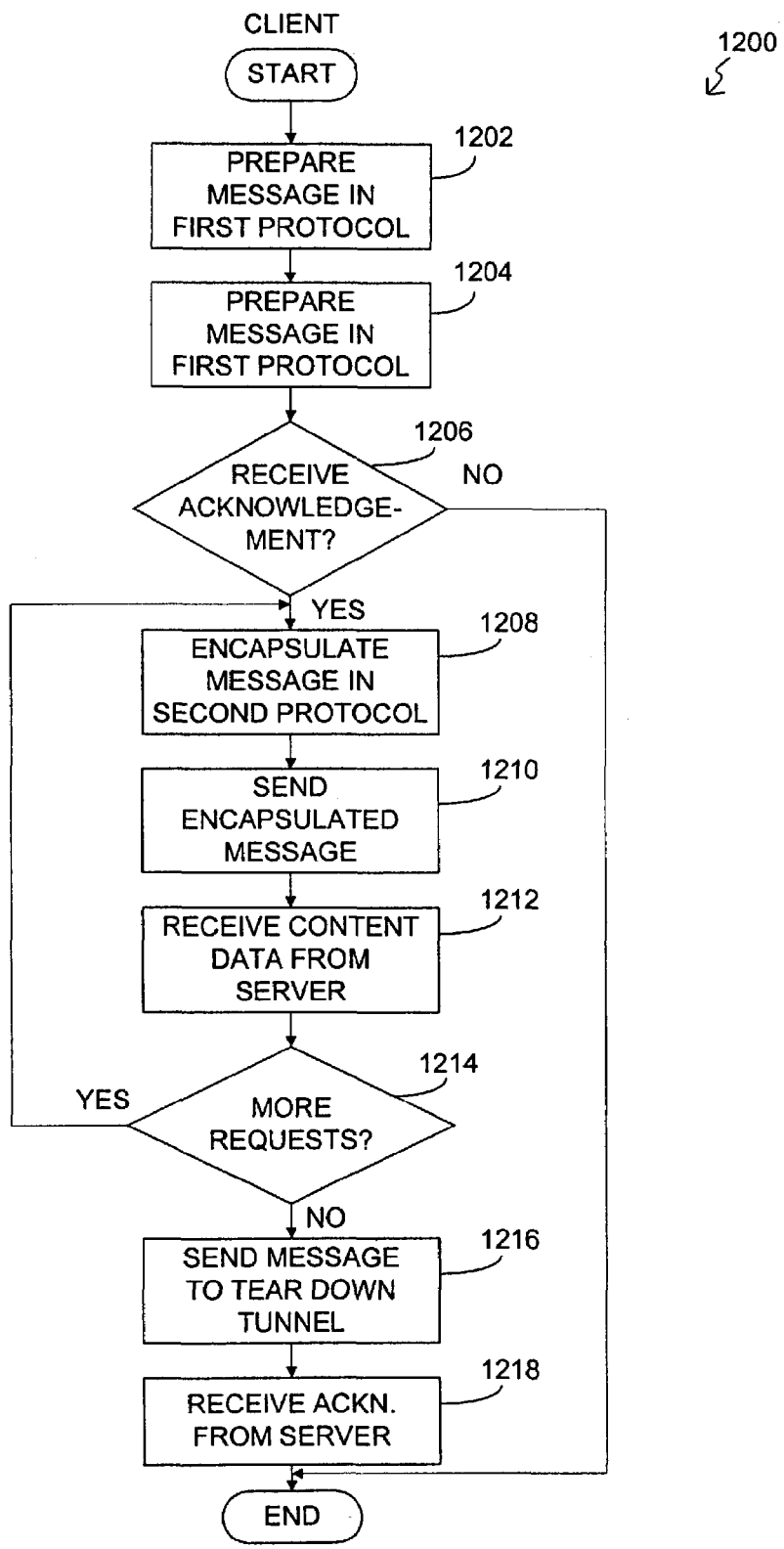

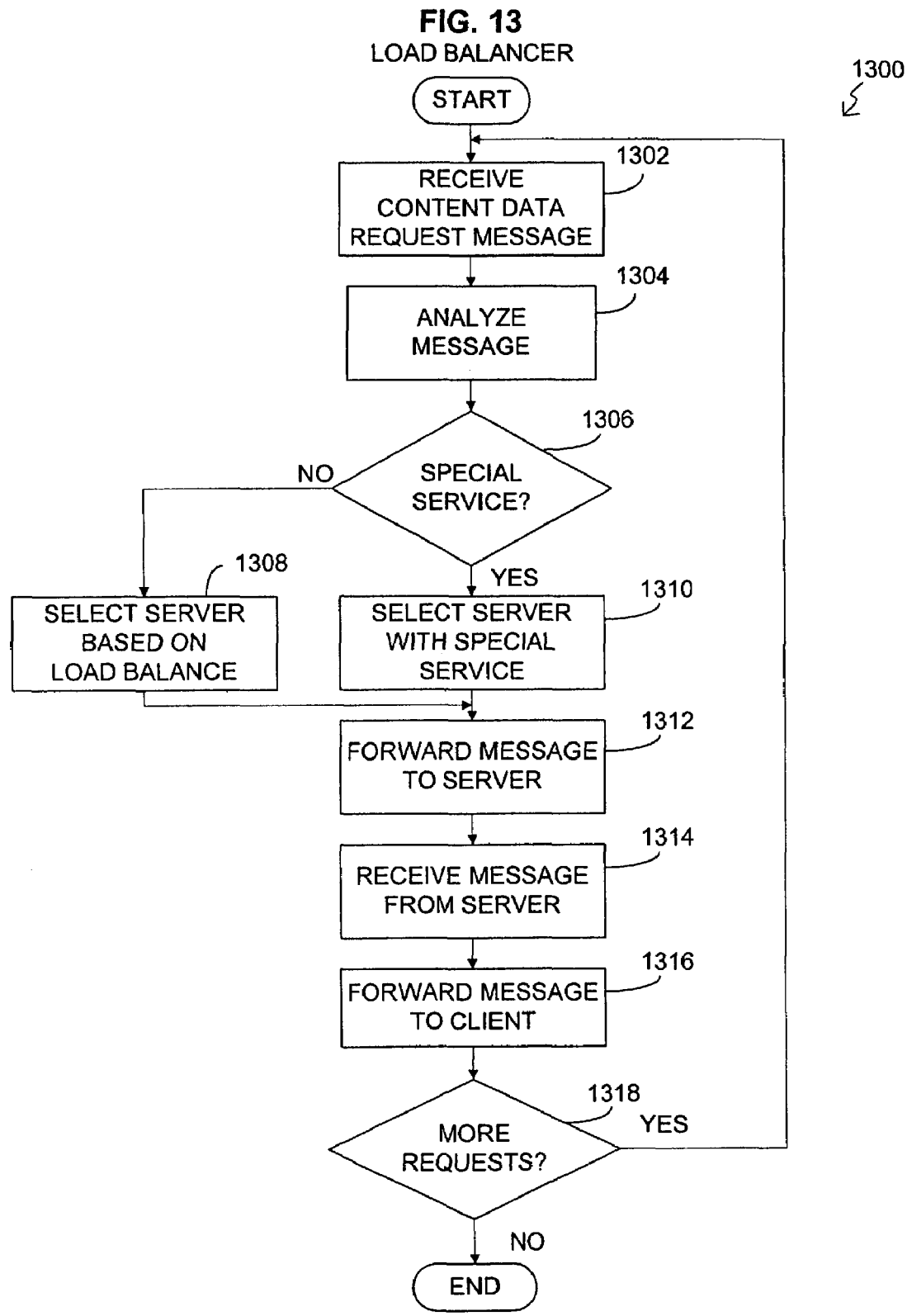

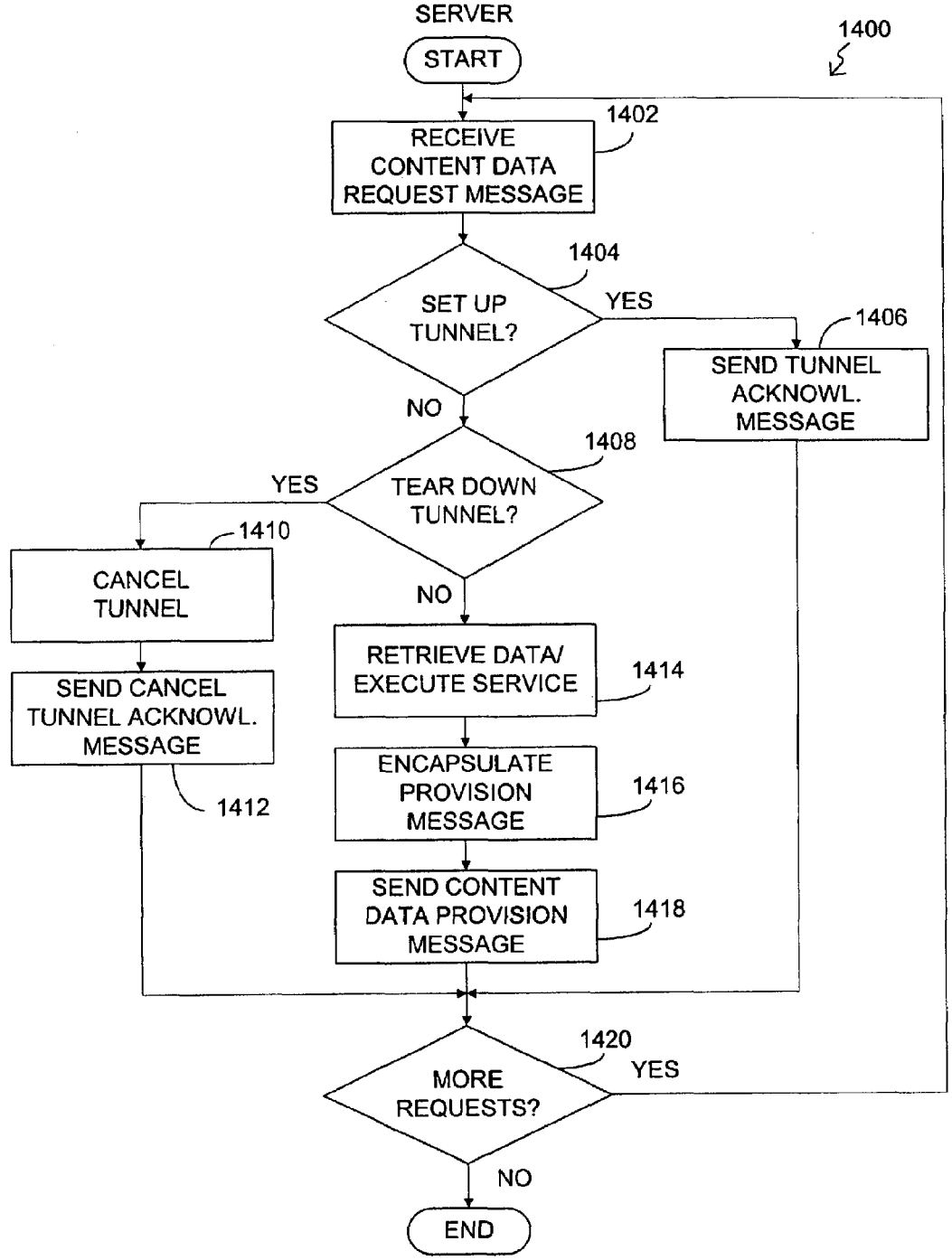

METHODS AND SYSTEMS FOR INTEGRATING WITH LOAD BALANCERS IN A CLIENT AND SERVER SYSTEM

CROSS-REFERENCE TO RELATED APPLICATIONS

This Application claims the benefit of the filing date and priority to the following foreign patent application, which is incorporated herein by reference:

European Patent Application serial number 01127748, entitled "A METHOD FOR INTEGRATING WITH LOAD BALANCERS IN A CLIENT AND SERVER SYSTEM", filed Nov. 21, 2001.

FIELD OF THE INVENTION

The present invention relates to client and server communication, and in particular, relates to maintaining communication between a particular client and a particular server when there is a load balancer.

BACKGROUND OF THE INVENTION

Computers have been used for a number of purposes ranging, for example, from text document editing to distributed processing involving the transfer of data between data processing systems.

With a growing number of data processing devices having access to computer networks, such as to local area networks and world-wide networks, a growing number of computer programs are offered to users that use a plurality of data processing units. Such applications may be found, for example, in the fields of home banking, office applications, remote e-mail applications, and supercomputing applications. In corresponding data communications systems, high speed links, via permanent connections, circuit-switched connections or packet-switched connections are used to exchange digital data at high speed (and high-bit rates) such that data, including graphics data and data from moving images, can be exchanged among the data processing devices.

Data communications systems typically do not require that all participating data processing devices have the same processing capabilities, that is the same processing power. That is, a main computer having a high level of computing facilities can provide services to a number of less powerful computers through one or more of the above-described communication links. Since the less powerful computers are typically assigned the tasks of accessing the main computer and requesting processing facilities or data from the main computer while the main computer itself serves the data to the less powerful computers, the main computer is typically referred to as a server (or server unit) and the less powerful computers are typically referred to as clients (or client units). In such a scenario, a client requests the execution of an application program that resides on the server, and receives a data processing result or content data from the server via a network or communication link that connects the client and the server.

There are also systems in which a plurality of clients can connect to a portal for the execution of an application. A portal is a site on a network that includes a plurality of servers that provide a variety of services, including for example, office applications, searching functions, news functions, e-mail applications, discussion groups, on-line shopping and links to other sites on the network. The servers can be linked via back-end tunneling. A portal may thus be a general-purpose site offering the capability to perform applications on behalf of the client or to assist the clients in executing an application.

In a client and server or portal scenario, the server may be a large computing device that has sufficient resources to store and execute computer programs, which are used to provide services to the client. Since the computer programs and sufficient computing power are typically available at the server side, but typically not at the client side, the client may be a data processing unit with less powerful computing resources than the server. The client therefore typically functions as an interface to receive user commands required to execute a desired computer program on the server, to provide requests to the server (that is, to transmit commands from the client to the server), and to receive and display computation results from the server.

Conventional Server and Client Configuration

Referring to FIG. 1, FIG. 1 depicts a conventional data processing system 100. In FIG. 1, a server 102 and clients 104, 106, 108, 110, and 112 communicate through communication links 114 and 116, typically set up through a communication network 118 that can include the Internet. Communication network 118 includes, for example, an intranet 120 to which clients 104, 106, 108 are connected. As illustrated, clients can also be connected to server 102 without communicating via the Internet, such as client 110. An additional server 122 (as shown in dashed lines) can also be provided.

Communication link 114 illustrates that client 106 has sent a request for content data to server 102. These requests from the client for data are called content data request messages. The content data is returned from the server in a content data provision message. Although the request is received at server 102, the content data may be provided from server 122, which transmits the content data to server 102, for example, through a back-end tunnel.

FIG. 2 shows a more detailed block diagram of a conventional server 202 and a conventional client 204. Server 202 and client 204 communicate through communication link 206 connected to an interface 208 in server 202 and an interface 210 in client 204.

Client 204 typically comprises a content data request unit 212 (such as a browser) for sending content data request messages, a client processor 214, and a memory 216. A number of computer programs 218, such as a browser and a word processor, are in memory 216. Client 204 also comprises a display 220 and a page setting unit 222 for formatting pages. Page setting unit 222 can also be a browser.

Server 202 typically comprises a request message receiving unit 224 (such as a web server program) for receiving content data request messages, a server processing unit 226 including an Application Programming Interface 228, at least one data processing unit 230 (if server 202 uses Java™ technology, data processing unit 230 comprises, for example, one or more servlets or JavaServer™ pages), a content data providing unit 232 for sending content data provision messages, a local database 234 including content data 236 such as HTML web pages, and a special service provider 238 for providing a special service available on server 202. Special service provider 228 can be a web server program. A service is considered "special" when it is provided by one of the servers, and may not be provided by the others. For example, a server provides a special service when that server alone hosts a web page and contains the web page data. Sun Microsystems, Sun, the Sun logo, Java, JavaServer, portalconnect, portal, and GRIP are trademarks or registered trademarks of Sun Microsystems, Inc. in the United States and other countries.

Referring to FIG. 3, FIG. 3 depicts an example of typical operations that are carried out by client 204 and server 202 for the typical scenario shown in FIG. 1. These operations are described below.

Conventional Request/Provision of Content Data

Typical client and server operations include a client requesting content data from a server through a content data request message, and the server returning the requested content data in a content data provision message. In an example, a user at client 204 wants to access a web page document from server 202. The web page can be available at server 204 or at another location. First, the user selects one of client 204's programs 218 (step 302). The selected programs 218 is, for example, a browser that is executed at the client. When using the browser, the user clicks with a mouse pointer on a particular place on display 220 to retrieve a web page from the server. The content data request unit 212 sends a content data request message 240 requesting the web page data to server 202 (step 304). In accordance with the Internet protocol, content data request message 240 is typically an HTTP protocol message and requests the transfer of HTML pages from database 234 located within server 202 (or located elsewhere outside server 202). The HTTP request message includes the URL from which the HTML web pages should be retrieved and additional header information.

After setting up communication link 206 between client 204 and server 202, server 202 receives content data request message 240 (step 306). Client 204 can also request sever 202 to execute processing programs 230 that are located on the server, such as servlets.

Server processing unit 226 together with content data providing unit 232 statically or dynamically retrieve the requested content data, that is the HTML web pages (step 308). In a static retrieval, server processing unit 226 accesses local database 234 and retrieves the HTML web pages. In a dynamic retrieval, server processing unit 226 runs additional programs, such as servlets 230, to retrieve or generate data from a remote site in a dynamic manner, such as from remote server 122. For these operations, server processing unit 226 uses Application Programming Interface (API) 228 for coordinating which servlets 230 are used. Server processing unit 226 then determines which page format to use for client 204, that is the MIME-Type (step 310).

Content data providing unit 232 of server 202 then provides, through communication link 206, the retrieved or generated content data or instruction data set to client 204 in a content data provision message 242 (step 312).

Client 204 then receives content data provision message 242 from server 202 (step 314). Responsive to a user selection, client 204 then displays the received content data on display 220, stores it on a disc, or prints it out on a printer (step 316).

If the requested content data includes web-page data (e.g., HTML web pages), client 204 typically requests complete data sets relating to one page, which are transferred from server 202. Therefore, client 204 then determines if the user requires further web pages, that is further content data, from server 202 (step 318). If client 204 determines that further pages are required, processing returns to step 304. If client 204 determines that no further pages are required, client 204 closes communication link 206 after some time, for example, by stopping the browser (step 320).

As described above in step 308, server 202, which has received content data request message 240 in step 306, attempts to retrieve or generate the requested content data statically or dynamically. For example, if server 202 is to retrieve or generate content data from a special service contained in special service provider 238 of server 202, then server 202 can generate the content data "locally at server 202. The requested content data from a special service provider, however, typically resides elsewhere on network 118. For example, the desired content data can reside on server 122. In this case, server 202 uses dynamic retrieval and generation of the content data. In doing so, the first addressed server 202 communicates with the additional server 122 before returning the content data to client 204 in step 312.

Use of a Load Balancer for Routing Messages

Referring to FIGS. 4a and 4b, a data processing system 400 has a number of servers 402, 404, 406, and 408 and a number of clients 410, 412, 414, and 416. Each of the servers is similar to server 202 shown in FIG. 2. And each of the clients is similar to client 204 of FIG. 2. Accordingly, the item numbers of FIG. 2 are used to designate similar elements in FIG. 4. The servers and clients communicate via communication network 418 that includes a client network 420, such as an intranet, on the client side of network 418 and a server network 422, such as another intranet, on the server side. The servers can also communicate with each other via a back end tunnel 424.

The clients send content data request messages 430 over communication network 418 to the servers. En route, the content data request messages arrive at load balancer 426, which distributes the content data request messages to individual servers on the server network. In FIGS. 4a and 4b, communication network 418 is shown for illustrative purposes between the clients and the load balancer. It should be understood, however, that communication network 418 may also have parts existing between the load balancer and the servers.

The load balancer comprises a load determining unit 432 for determining the server's processing loads, a message distribution unit 434 for distributing received messages to the clients and servers, and a balancer control unit 436. The balancer control unit 436 controls load determining unit 432 and message distribution unit 434, which distributes the content data request messages from the plurality of clients to the plurality of servers dependent on the processing loads of said individual servers.

The servers return content data provision messages 438 via the load balancer to the respective clients in response to the content data request messages sent from the clients.

Considering that the data processing system of FIGS. 4a and 4b has a large number of clients and a large number of servers exchanging content data request and provision messages, the load balancer's load balancing function is typically necessary to avoid servers from becoming overloaded with content data request messages, which could delay server response times. Therefore, even if client 412 issues a content data request message requesting content data from special service unit 440 in server 404 (that is from a particular server), the load balancer may route this content data request message to server 402 instead, because server 402 may have a smaller processing load than server 404 at that time. In this case, the servers may establish a back end tunnel between server 402 and server 404 to retrieve the content data from the special service unit 440 in server 404. However, it is server 402 that will return the requested content data to client 412.

FIG. 5 illustrates a flow chart in which the typical operations of FIG. 3 are extended to include the use of a load balancer. Referring to FIG. 5, first, client 410 receives user input to execute one of client 410's programs, such as a browser program (step 502). This is done in a manner similar to step 302 described above with reference to FIG. 3. When the user clicks with a mouse pointer on a particular place on display 220 of client 410, content data request unit 212 of client 410 sends a content data request message 430 to server 408, requesting for example web page data (step 504).

The load balancer receives the content data request message before it arrives at a particular server, and determines which server is to receive the content data request message in accordance with the processing load of each server (step 506). The server identified by the load balancer as having a small enough processing load to receive the content data request message, namely server 402, then receives the issued content data request message from the load balancer (step 508). Then, server 402 retrieves the requested content data from the location where the desired content data resides, namely from server 404 (step 510). As illustrated in FIG. 5, server 402 can retrieve the requested content data from server 404 through the use of the back end tunnel.

Server 402 then determines which page format to use for client 410, such as the MIME-Type (step 512). Content data providing unit 232 of server 402 then provides, through communication network 418, the retrieved or generated content data or instruction data set to client 410 via the load balancer in content data provision message 438 (step 514).

Client 410 then receives content data provision message 438 with the content data or instruction data set from the load balancer (step 516). Responsive to a user selection, client 410 can then display the received content data on display 220 of client 410, store it on a disc, or print it out on a printer (step 518).

If the requested content data is web page data (e.g., HTML web pages), client 410 typically requests complete data sets relating to one page, which are then transferred from server 402 to client 410. Client 410 then determines if the user requires further web pages, that is data sets, from server 402 (step 520). If client 410 determines that further web pages are required, processing returns to step 504. If client 410 determines that no further web pages are required, client 410 closes communication to server 402 after some time, for example, by stopping the browser (step 522).

Disadvantages of the Use of the Load Balancer

As described above, the use of a load balancer, with its load balancing functionality, can assist particular servers from becoming overloaded with data content request messages. When the data content request message is implemented in a communication protocol that does not care which server returns the content data, the load balancing functionality does not present a problem. In an example, the content data request message is implemented in the HTTP protocol and requests an HTML web page from a database located within a server. The message contains the URL from which the HTML web page should be retrieved. Using the URL, the data will be retrieved from the correct site. However, as a result of the use of the load balancer, the message may still be diverted to another server.

On the other hand, a client might want the data content request message directed to a particular server that has the content data or special service, instead of being first directed to another server due to load balancing. This situation arises when the request message is implemented in a communication protocol that specifies that messages for a particular client should be sent to a particular server. In such a communication protocol implementation, such as portalconnect™ protocol (also known as portal™ protocol), the content data request message contains a user field including identification information of the user and/or client and an identification of the special service unit from which content data is to be retrieved. Another protocol used for this purpose is Generic Interconnect Protocol (GRIP™) protocol. Portalconnect, portal, and GRIP are trademarks or registered trademarks of Sun Microsystems, Inc., Palo Alto, Calif.

Load balancers, however, do not typically allow for the detection of such a user field transmitted in the data stream, and therefore the load balancers cannot direct traffic to the desired host. Instead, the severs tunnel the requested data on the server back end in the typical manner, as described above with reference to FIGS. 4a and 4b. Further, the load balancers might not be able to read the user field, as is the case when the load balancer cannot read the communication protocol implementation of the request message.

Therefore, products that require particular communication paths during message exchange are hindered by typical load balancers. That is, if traffic from a particular client is to be directed to a particular server, the load balancer, which normally provides an even load distribution among servers, will typically ignore the desired effect.

SUMMARY OF THE INVENTION

Methods, systems, and articles of manufacture consistent with the present invention provide for exchanging messages directly between a particular client and a particular server regardless of the use of a load balancer. For purposes of this disclosure, the term "directly" means that the messages are exchanged between the client and the desired server without first going to another server for processing on the server side of the load balancer. That is, the messages can first pass through another server, such as in a token-ring network, however, the message is not processed at that other server. Typical load balancers normally use a load balancing function to distribute messages to a plurality of servers based on the servers' processing availabilities. To override this load balancing function, the client establishes a tunnel with the desired server by sending a message to the desired server that includes a request to establish the tunnel. The load balancer analyzes the message, and if it recognizes the request as being directed to a particular server, sends the message directly that server, instead of sending the message to an arbitrary server based on a load balancing function. This provides improved efficiency during message exchange between the client and the desired server.

Also, when the message is implemented in a protocol that the load balancer does not recognize, the client encapsulates the message in a protocol recognizable by the load balancer, so that the load balancer can determine whether the message is directed to a particular server.

For example, a user at the client wants to use a web browser program on the client to a view a web page that is provided from a particular server. Since the web page data is located on the-particular server, and not on other servers in the network, the service that is provided by the particular server is considered a special service. The web browser on the client uses the portalconnect™ protocol, but the load balancer recognizes HTTP-protocol messages instead of portalconnect™ protocol messages. So the load balancer would not be able to recognize that a request in a client's message is directed to a particular server. Accordingly, the client encapsulates the portalconnect™ message in the HTTP protocol. The encapsulated message includes header information that indicates that the client wants to set up the tunnel. Since the load balancer can read the message that is encapsulated in the HTTP protocol, the load balancer identifies the desired server from the header information and sends the message directly to the desired server. In other words, the load balancer functionality is overridden when a message is passed through the tunnel.

In accordance with methods consistent with the present invention, a method in a data processing system having a client, a load balancer performing load balancing functionality, and a plurality of servers, the client having a program, is provided. The method comprises the steps performed by the program of: generating a message to bypass the load balancing functionality, the message indicating a selected one of the servers; and sending the message to the load balancer, whereupon the load balancing functionality is bypassed and the message is sent directly to the selected server by the load balancer.

In accordance with methods consistent with the present invention, a method in a data processing system is provided. The data processing system has a client, a load balancer performing load balancing functionality, and a plurality of servers, the client having a program. The method comprises the steps performed by the program of: generating a message in a portalconnect™ protocol to bypass performing the load balancing functionality, the message including a request for a web page data from a selected one of the servers and a request to establish a tunnel between the client and the selected server; encapsulating the message within an HTTP protocol; sending the message to the load balancer, whereupon the load balancing functionality is bypassed and the message is sent directly to the selected server by the load balancer; and receiving a return message including the web page data from the selected server.

In accordance with articles of manufacture consistent with the present invention, a computer-readable medium containing instructions that cause a client program in a data processing system having a client, a load balancer performing a load balancing functionality, and a plurality of servers, to perform a method is provided. The method comprises the steps of: generating a message to bypass performing the load balancing functionality, the message indicating a selected one of the servers; and sending the message to the load balancer, whereupon the load balancing functionality is bypassed and the message is sent directly to the selected server by the load balancer.

In accordance with articles of manufacture consistent with the present invention, a computer-readable medium containing instructions that cause a client program in a data processing system having a client, a load balancer performing a load balancing functionality, and a plurality of servers, to perform a method is provided. The method comprises the steps of: generating a message in a portalconnect™ protocol to bypass performing the load balancing functionality, the message including a request for a web page data from a selected one of the servers and a request to establish a tunnel between the client and the selected server; encapsulating the message within an HTTP protocol; sending the message to the load balancer, whereupon the load balancing functionality is bypassed and the message is sent directly to the selected server by the load balancer; and receiving a return message including the web page data from the selected server.

In accordance with systems consistent with the present invention, a client data processing system is provided. The client data processing system comprises: a memory comprising a program that generates a message to bypass performing a load balancing functionality at a load balancer, the message indicating a selected one of a plurality of servers, and sending the message to the load balancer, whereupon the load balancing functionality is bypassed and the message is sent directly to the selected server by the load balancer; and a processing unit that runs the program.

In accordance with systems consistent with the present invention, a client data processing system is provided. The client data processing system comprises: means for generating a message to bypass performing a load balancing functionality at a load balancer, the message indicating a selected one of a plurality of servers; and means for sending the message to the load balancer, whereupon the load balancing functionality is bypassed and the message is sent directly to the selected server by the load balancer.

In accordance with articles of manufacture consistent with the present invention, a computer-readable memory device encoded with a program having a data structure is provided. The program is run by a processor of a client in a data processing system having the client, a load balancer performing load balancing, and a plurality of servers. The data structure comprises: a message having a user information including a client identifier and a desired server identifier, the message being of a first protocol, wherein the message is encapsulated in a second protocol recognized by the load balancer and different than the first protocol, the encapsulated message having a header including the client identifier and the desired server identifier, and wherein the encapsulated message is effective to bypass the load balancing functionality so that the encapsulated message is delivered directly from the client to the desired server.

In accordance with methods consistent with the present invention, a method in a data processing system having a client, a load balancer performing a load balancing functionality, and a plurality of servers, the load balancer having a program, is provided. The method comprises the steps performed by the program of: receiving a message from the client; determining whether the message indicates a selected one of the servers; when the message does not indicate the selected server, sending the message to a determined one of the servers based on the load balancing functionality; and when the message indicates the selected server, bypassing the load balancing functionality and sending the message directly to the selected server.

In accordance with methods consistent with the present invention, a method in a data processing system having a client, a load balancer performing a load balancing functionality, and a plurality of servers, the load balancer having a program, is provided. The method comprises the steps performed by the program of: receiving, from the client, a message requesting web page data, the message being implemented in a portalconnect™ protocol encapsulated within an HTTP protocol, the HTTP protocol encapsulation including a header information; reading the header information; determining whether the header information indicates a selected one of the servers; when the header information does not indicate the selected server, sending the message to a determined one of the servers based on the load balancing functionality; when the header information indicates the selected server, bypassing the load balancing functionality and sending the message directly to the selected server; receiving a return message including the web page data; and sending the return message to the client.

In accordance with articles of manufacture consistent with the present invention, a computer-readable medium containing instructions that cause a load balancer program in a data processing system having a client, a load balancer performing a load balancing functionality, and a plurality of servers, to perform a method is provided. The method comprises the steps of: receiving a message from the client; determining whether the message indicates a selected one of the servers; when the message does not indicate the selected server, sending the message to a determined one of the servers based on the load balancing functionality; and when the message indicates the selected server, bypassing the load balancing functionality and sending the message directly to the selected server.

In accordance with articles of manufacture consistent with the present invention, a computer-readable medium containing instructions that cause a client program in a data processing system having a client, a load balancer performing a load balancing functionality, and a plurality of servers, to perform a method is provided. The method comprises the steps of: receiving, from the client, a message requesting web page data, the message being implemented in a portal-connect™ protocol encapsulated within an HTTP protocol, the HTTP protocol encapsulation including a header information; reading the header information; determining whether the header information indicates a selected one of the servers; when the header information does not indicate the selected server, sending the message to a determined one of the servers based on the load balancing functionality; when the header information indicates the selected server, bypassing the load balancing functionality and sending the message directly to the selected server; receiving a return message including the web page data; and sending the return message to the client.

In accordance with systems consistent with the present invention, a load balancer is provided. The load balancer comprises: a memory comprising a program that receives a message from a client, determines whether the message indicates a selected one of a plurality of servers, sends the message to a determined one of the servers based on a load balancing functionality when the message does not indicate the selected server, and bypassing the load balancing functionality and sending the message directly to the selected server when the message indicates the selected server; and a processing unit that runs the program.

In accordance with systems consistent with the present invention, a load balancer is provided. The load balancer comprises: means for receiving a message from a client; means for determining whether the message indicates a selected one of a plurality of servers; means for sending the message to a determined one of the servers based on the load balancing functionality, when the message does not indicate the selected server; and means for bypassing the load balancing functionality and sending the message directly to the selected server, when the message indicates the selected server.

Other systems, methods, features, and advantages of the invention will become apparent to one with skill in the art upon examination of the following figures and detailed description. It is intended that all such additional systems, methods, features, and advantages be included within this description, be within the scope of the invention, and be protected by the accompanying drawings.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

FIG. 4b depicts a more detailed block diagram of the data processing system of FIG. 4a;

FIG. 5 depicts a flow diagram illustrating the steps of exchanging messages in a typical client and server communication involving a load balancer;

FIG. 12 depicts a flow diagram illustrating the steps performed by the client of FIG. 8;

FIG. 13 depicts a flow diagram illustrating the steps performed by the load balancer of FIG. 11; and FIG. 14 depicts a flow diagram illustrating the steps performed by the server of FIG. 7.

DETAILED DESCRIPTION OF THE INVENTION

Figure 1:
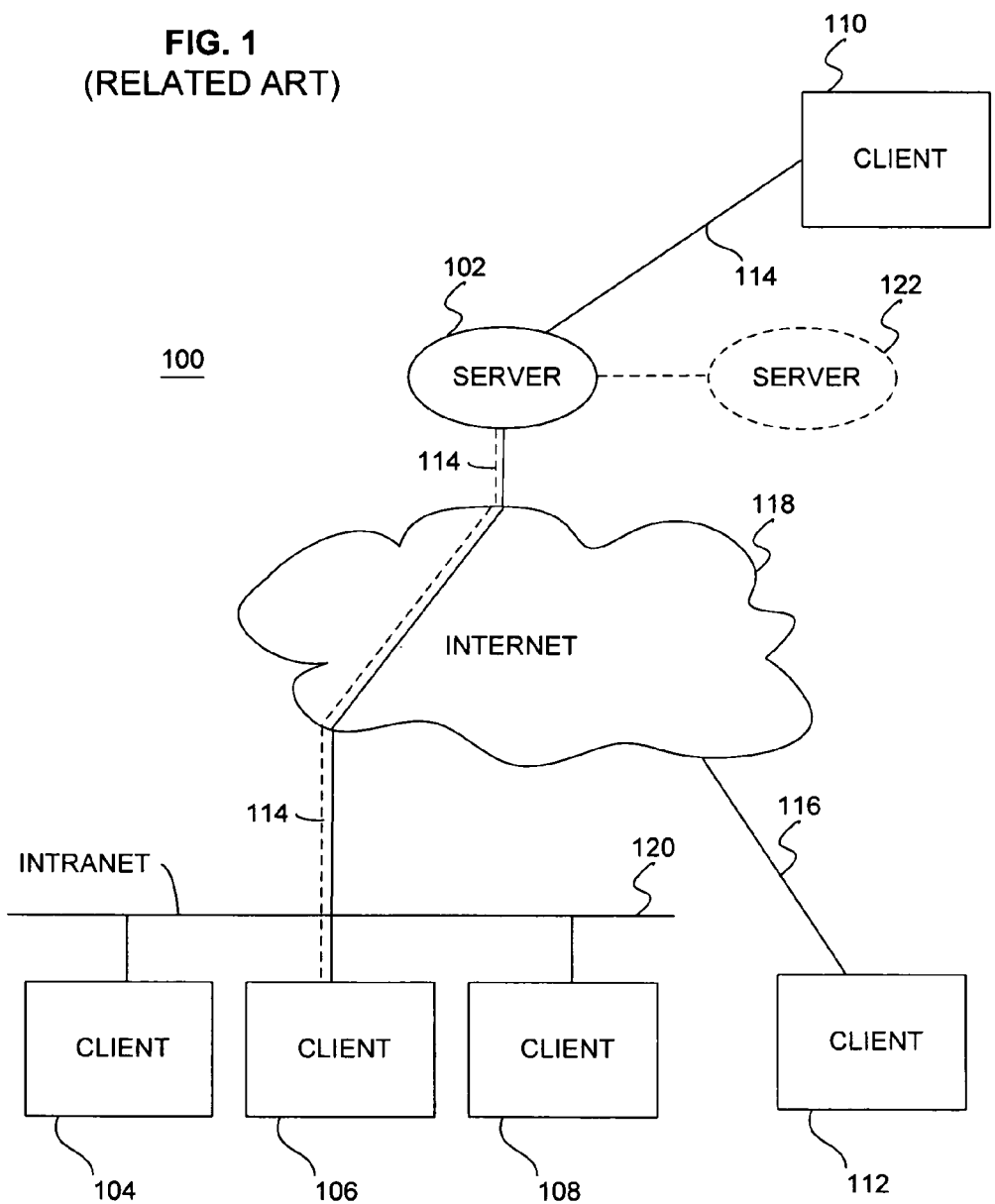
FIG. 1 depicts a block diagram of a data processing system in which clients and servers communicate in a conventional manner.
Figure 2:
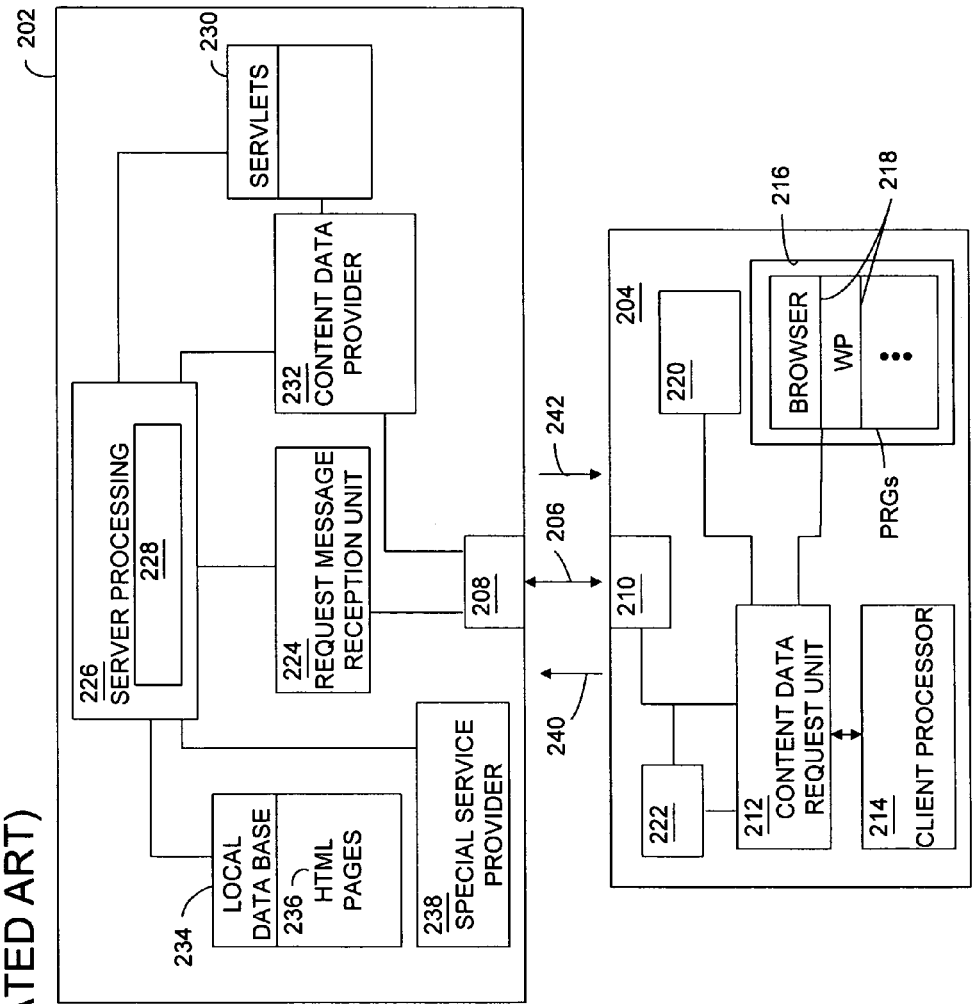
FIG. 2 depicts a more detailed block diagram of the client and servers shown in FIG. 1.
Figure 3:
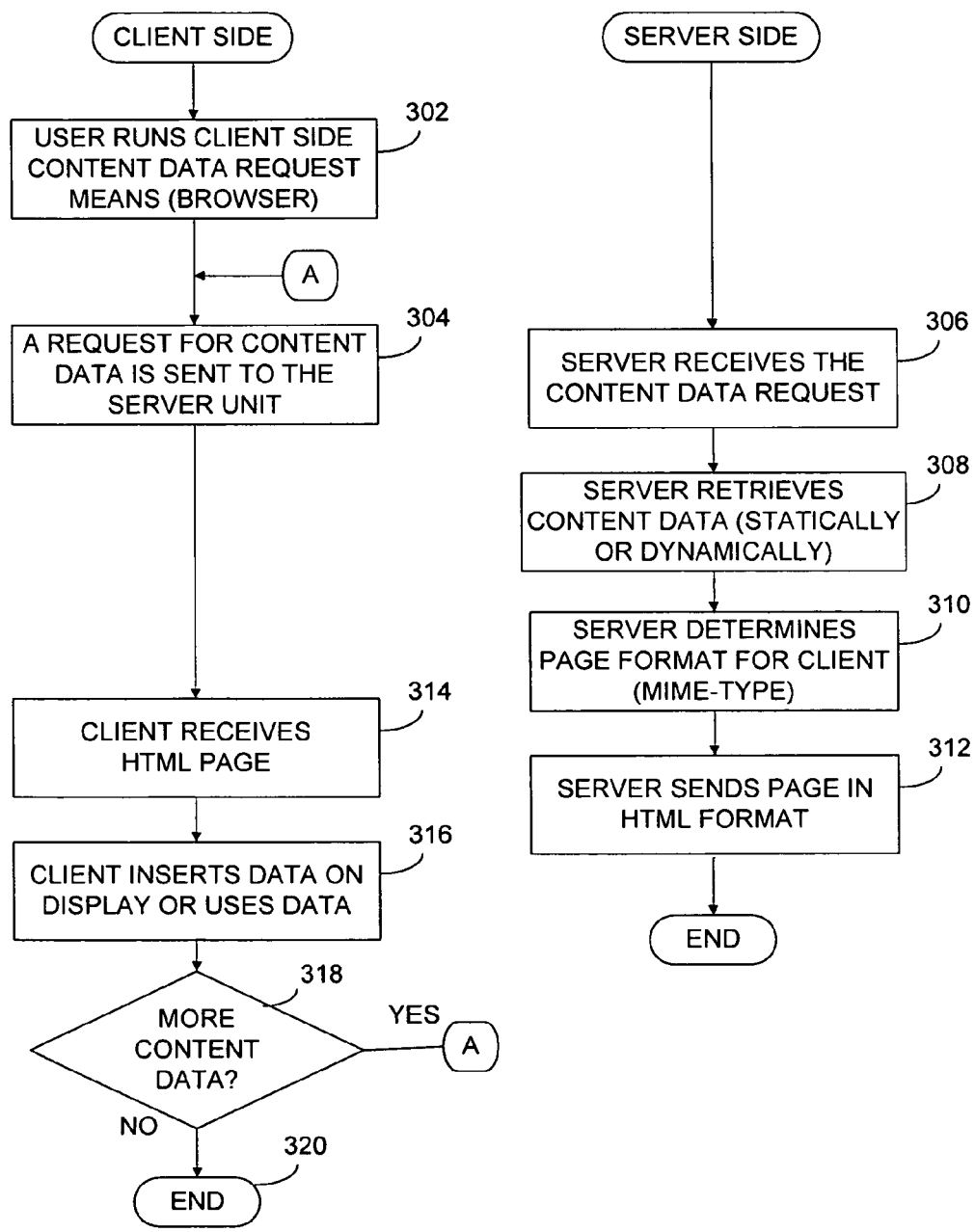
FIG. 3 depicts a flow diagram illustrating the steps of exchanging messages in a conventional client and server communication.

Reference will now be made in detail to an implementation consistent with the present invention as illustrated in the accompanying drawings. Wherever possible, the same reference numbers will be used throughout the drawings and the following description to refer to the same or like parts.

Methods, systems, and articles of manufacture consistent with the present invention provide for directly exchanging messages between a client and a desired server regardless of the use of a load balancer. The load balancer typically uses a load balancing function to distribute messages to a plurality of servers based on the servers' processing availabilities. To override this load balancing function, the client establishes a tunnel with the desired server by sending a message to the desired server that includes a request to establish the tunnel. The load balancer analyzes the message, and if it recognizes the request as being directed to a particular server, sends the message directly to that server, instead of sending the message to an arbitrary server based on a load balancing function. When the message is implemented in a protocol that the load balancer does not recognize, the client encapsulates the message in a protocol recognizable by the load balancer, so that the load balancer can identify the request in the message.

As an illustrative example, a user at the client wants to use a web browser program on the client to a view a web page that is provided from a particular server. Since the web page data is located on the particular server, and not on other servers in the network, the service that is provided by the particular server is considered a special service. The web browser on the client uses the portalconnect™ protocol, but the load balancer recognizes HTTP-protocol messages instead of portalconnect™ protocol messages. So the load balancer would not be able to recognize that a request in a client's message is directed to a particular server. Accordingly, the client encapsulates the portalconnect™-implemented message in the HTTP protocol. The encapsulated message includes header information that indicates that the client wants to set up the tunnel. Since the load balancer can read the message that is encapsulated in the HTTP protocol, the load balancer identifies the desired server from the header information and sends the message directly to the desired server. In other words, the load balancer functionality is overridden when a message is passed through the tunnel.

Therefore, the client message is not routed to another server due to load balancing, which provides improved efficiency during message exchange between the client and the desired server.

While the description below references examples relating to a special message exchange between a client and a server over the Internet, where web-pages are retrieved from a server that uses Java™ technology, one having skill in the art will appreciate that methods, systems, and articles of manufacture consistent with the present invention are not limited thereto. Also, reference is made below to a case where a client requests content data from a server and the server retrieves the content data from a database and returns it to the client. It should be understood, however, that the provision of the content data from the server can entail running various applications on the server side and not just retrieving the content data from the database.

Figure 6:
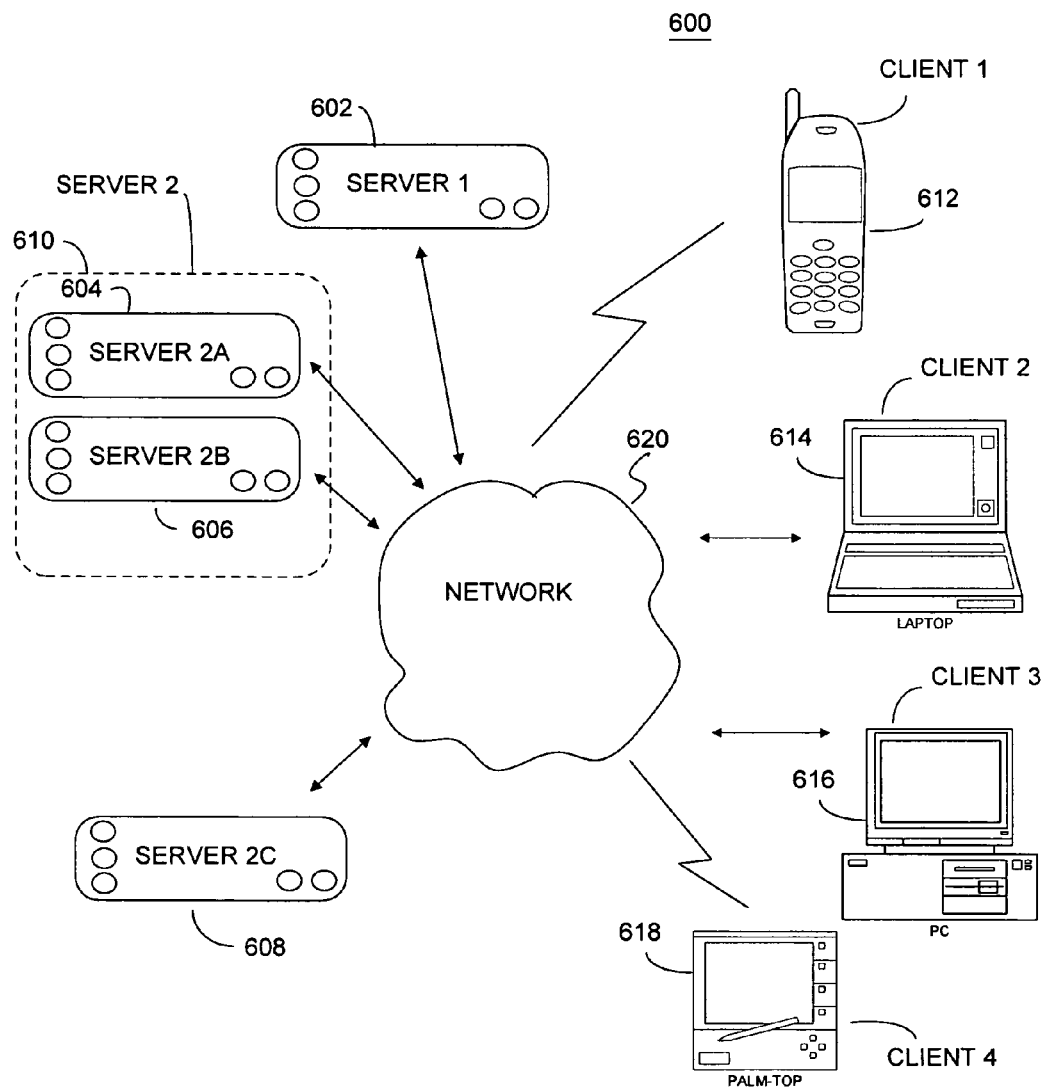
FIG. 6 depicts a block diagram of a data processing system suitable for use with methods and systems consistent with the present invention.

FIG. 6 depicts a block diagram of a data processing system 600 suitable for use with methods and systems consistent with the present invention. Data processing system 600 comprises a plurality of servers 602, 604, 606, and 608 and clients 612, 614, 616, and 618 connected to a network 620. The network is of a type that is suitable for connecting the clients and servers for communication, such as a circuit-switched network or a packet-switched network. Also, the network may include a number of different networks, such as a local area network, a wide area network such as the Internet, telephone networks including telephone networks with dedicated communication links, connectionless networks, and wireless networks. Each of the servers and clients shown in FIG. 6 is connected to the network via a suitable communication link, such as a dedicated communication line or a wireless communication link.

The clients are devices that are suitable for communicating over a network. For example, as illustrated, client 612 is a mobile telephone, client 614 is a laptop computer, client 616 is a desktop computer, and client 618 is a palm-top computer. These client devices may be any kind of device equipped with hardware and software in accordance with methods and systems consistent with the present invention. The embodiments of the various clients are presented for illustrative purposes, and the clients are not limited to the embodiments shown in FIG. 6.

In the illustrative example of FIG. 6, client 612, which is a mobile telephone, is connected to the network via a wireless communication link, whereas client 616, which is a desktop computer, is connected to the network via a communication link that includes a fixed transmission line, for example, to a household or an office.

Further, the clients are capable of receiving input from a user requesting to process content data. The user can input the user's request, for example, by making an input selection with a mouse click, with entry of input keys on the client, or by using the user's voice. The content data, can be, for example, a text document, video information, image information, audio information, could specify that the content data file contains data in a specific other format, that the content data file includes commands for further processing, parameters, results of scientific applications, or other types of content data. For example, the content data can be telephone directory information that can be displayed on the display device of client 612. As described in more detail below, the content data may be located within a memory or secondary storage of a desired server or at a location external to the server.

Figure 7:
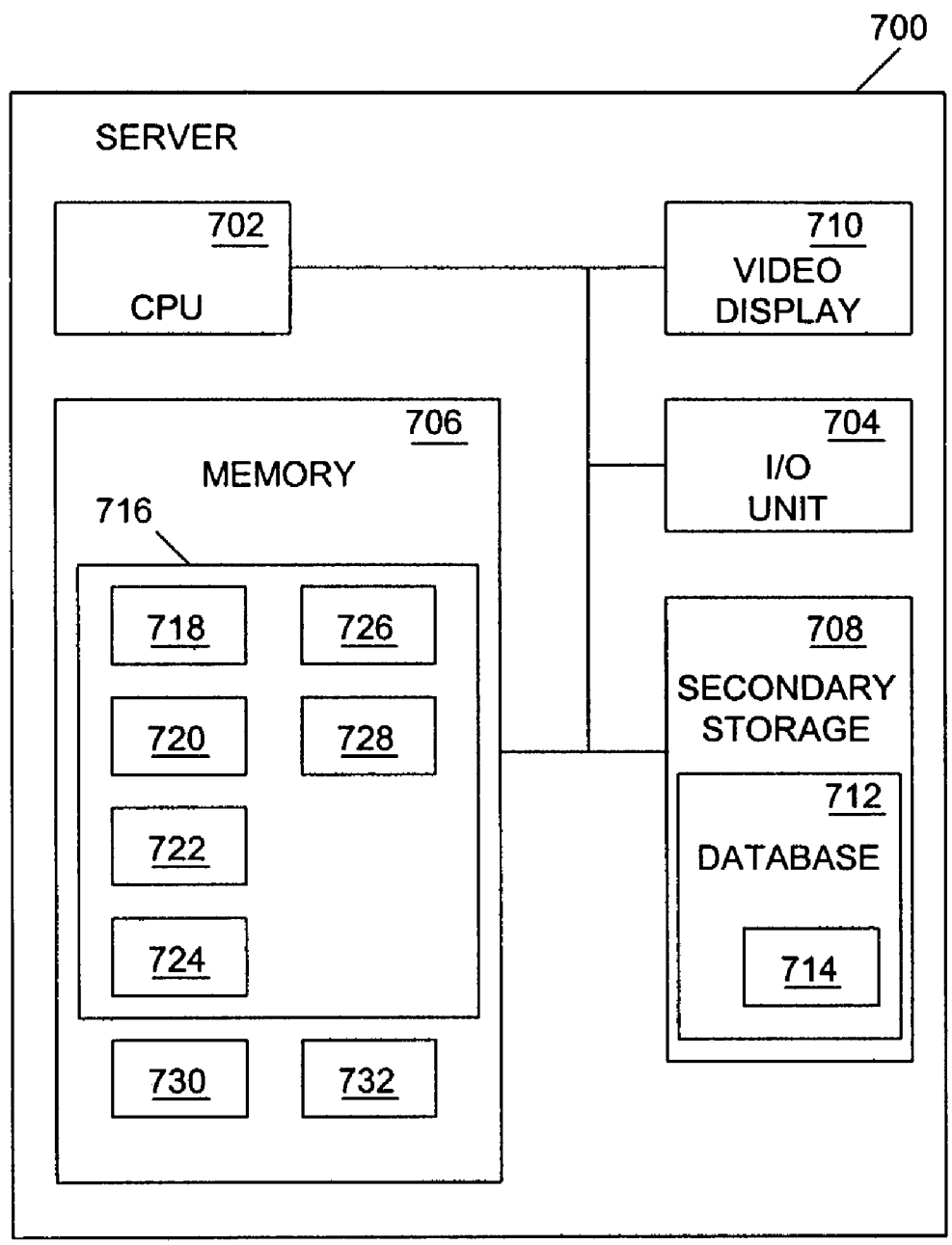
FIG. 7 depicts a block diagram of a server suitable for use with methods and systems consistent with the present invention.

Referring to FIG. 7, FIG. 7 shows a more detailed depiction of a server 700 that is illustrative of the servers 602–610 shown in FIG. 6. Server 700 comprises a central processing unit (CPU) 702, an input output I/O unit 704, a memory 706, a secondary storage device 708, and a video display 710. Server 700 may further comprise standard input devices such as a keyboard, a mouse or a speech processing means (each not illustrated).

Secondary storage 708 contains a local database 712 that includes a content data 714, such as one or more HTML web pages.

Memory 706 contains a server program 716 for receiving and processing content data request messages. Server program 716 has a server application program interface (API) 718 for interfacing to other programs, a request message reception code portion 720 for receiving content data request messages, a content data provider code portion 722 for sending content data provision messages, an interface code portion 724 for interfacing to the network, a tunnel code portion 726 for exchanging messages over a tunnel, and an encapsulation code portion 728 for encapsulating messages. Memory 706 also contains one or more servlets 730 and can contain one or more special service programs 732. Each of the programs and their code portions will be described in more detail below.

The servers shown in FIG. 6 can be operated by different providers or vendors. For example, a first vendor or a provider may operate server 602 and another provider or vendor may operate server 604. One of the vendors or providers can also operate two servers, as illustrated by the dashed-line box 610 surrounding servers 606 and 608.

Figure 8:
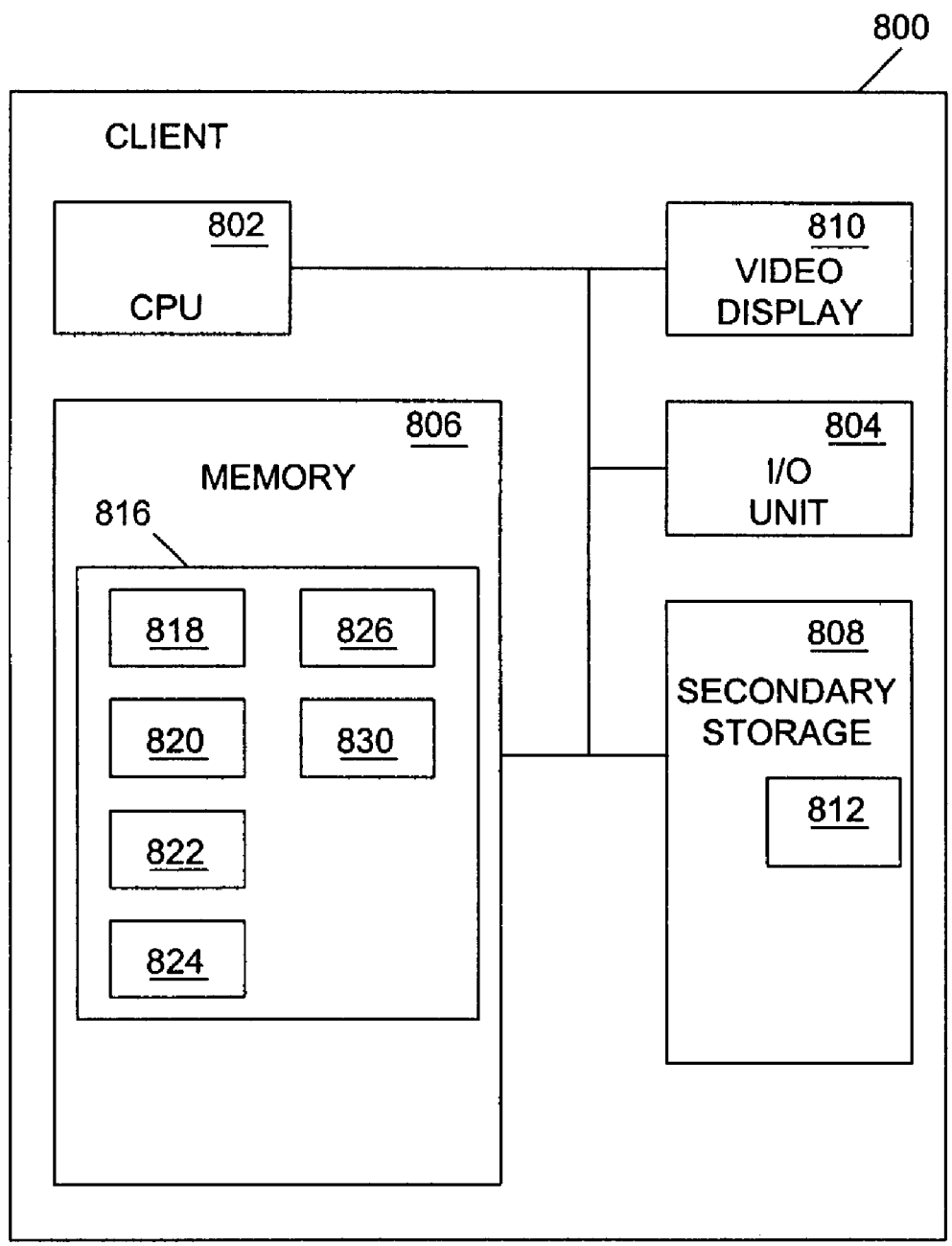
FIG. 8 depicts a block diagram of a client suitable for use with methods and systems consistent with the present invention.

Referring to FIG. 8, FIG. 8 shows a more detailed depiction of a client 800 that is illustrative of clients 612–618 shown in FIG. 6. Client 800 comprises a central processing unit (CPU) 802, an input output I/O unit 804, a memory 806, a secondary storage device 808, and a video display 810. Client 800 may further comprise standard input devices such as a keyboard, a mouse or a speech processing means (each not illustrated).

Secondary storage 808 contains one or more computer programs 812 that can be brought into memory 806 and executed by CPU 802. The computer program can be any type of program that can be run on the client, such as a browser program or a word processing program, however one having skill in the art will appreciate that the present invention is not limited thereto. Computer program 812 can also be one or more modules or plug-ins that are activated via associated file types. For example, computer program 812 can be a module that provides compatibility with various services or software versions, such as various versions of a calendar program or a software that displays text in various language.

Memory 806 contains a client program 816 for sending content data request messages and receiving content data provision messages. Client program 816 has a content data request code portion 818 for sending content data request messages, a page setting code portion 820 for formatting web pages, an interface code portion 822 for interfacing to the network, a tunnel code portion 824 for exchanging messages via a tunnel, and an encapsulation code portion 826 for encapsulating messages.

Figure 9:
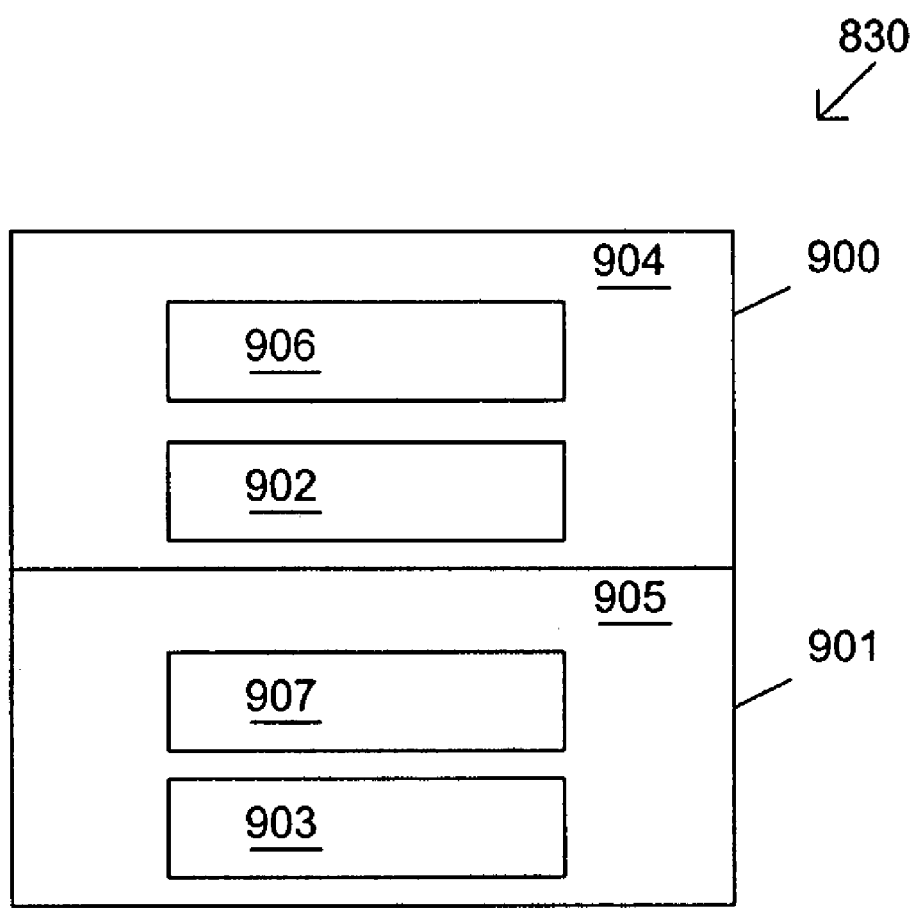
FIG. 9 depicts a block diagram of a data structure suitable for use with methods and systems consistent with the present invention.

The client program includes a data structure 830. Referring to FIG. 9, FIG. 9 shows data structure 830 in more detail. Data structure 830 has a plurality of entries 900 and 901. Each entry reflects a content data request message 902 and 903 of a first protocol encapsulated in a second protocol wrapper 904 and 905. The second protocol wrapper has a header 906 and 907 identifying the user and a special service program that is located on a desired server.

Each of the programs in the server's memory 706 and in the client's memory 806, as well as their respective components, will be described in more detail below. For illustrative purposes, it will be assumed that the various programs described herein are operating in a Java™ programming environment, however, one having skill in the art will appreciate that methods, systems, and articles of manufacture consistent with the present invention are not limited thereto. Also, the programs may comprise or may be included in one or more code sections containing instructions for performing their respective operations. While the programs are described as being implemented as software, the present implementation may be implemented as a combination of hardware and software or hardware alone.

Although aspects of one implementation of the programs described herein are depicted as being stored in memory, one having skill in the art will appreciate that all or part of systems and methods consistent with the present invention may be stored on or read from other computer-readable media, such as secondary storage devices, like hard disks, floppy disks, and CD-ROM; a carrier wave received from a network such as the Internet; or other forms of ROM or RAM either currently known or later developed. Further, although specific components of data processing system 600 have been described, one skilled in the art will appreciate that a data processing system suitable for use with methods, systems, and articles of manufacture consistent with the present invention may contain additional or different components.

Figure 4A:
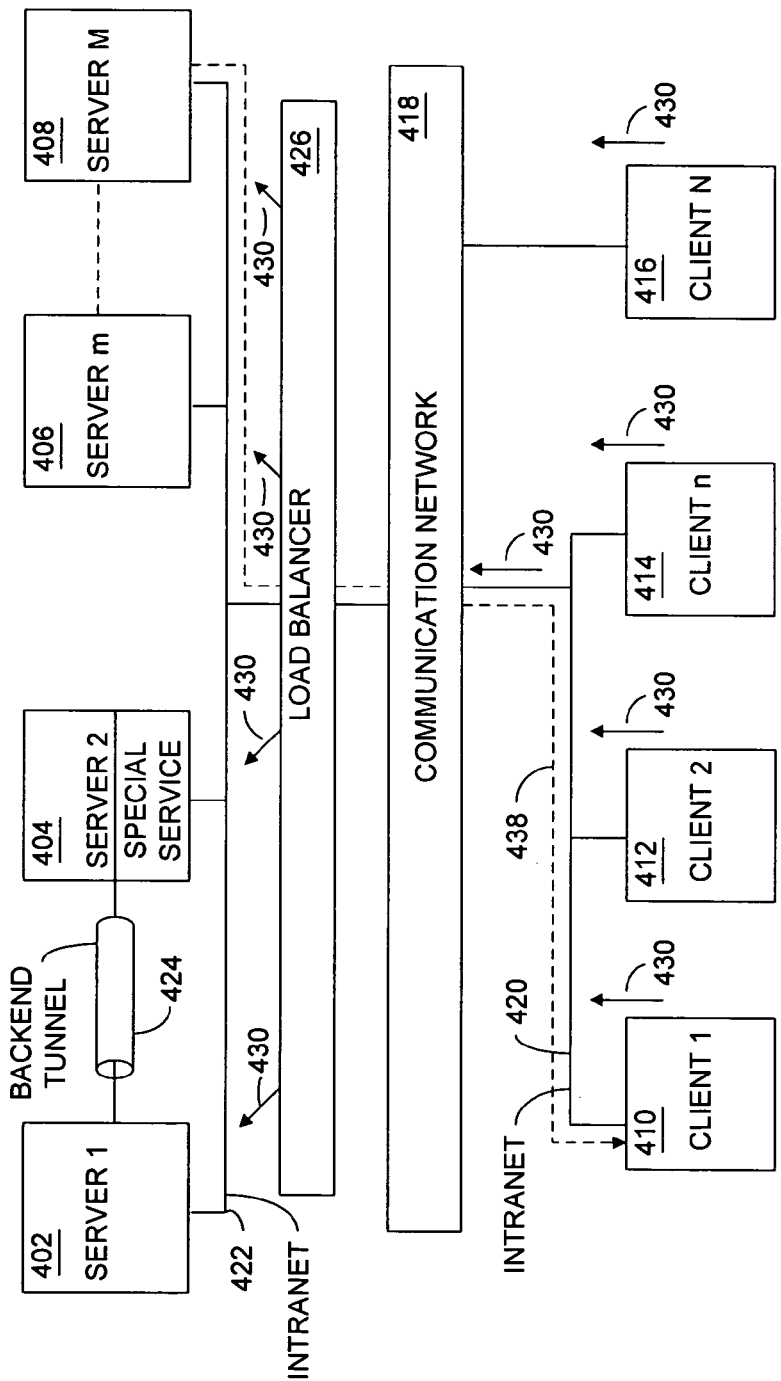
FIG. 4a depicts a block diagram of a conventional data processing system similar to the configuration in FIG. 1, however employing a load balancer.
Figure 4B:
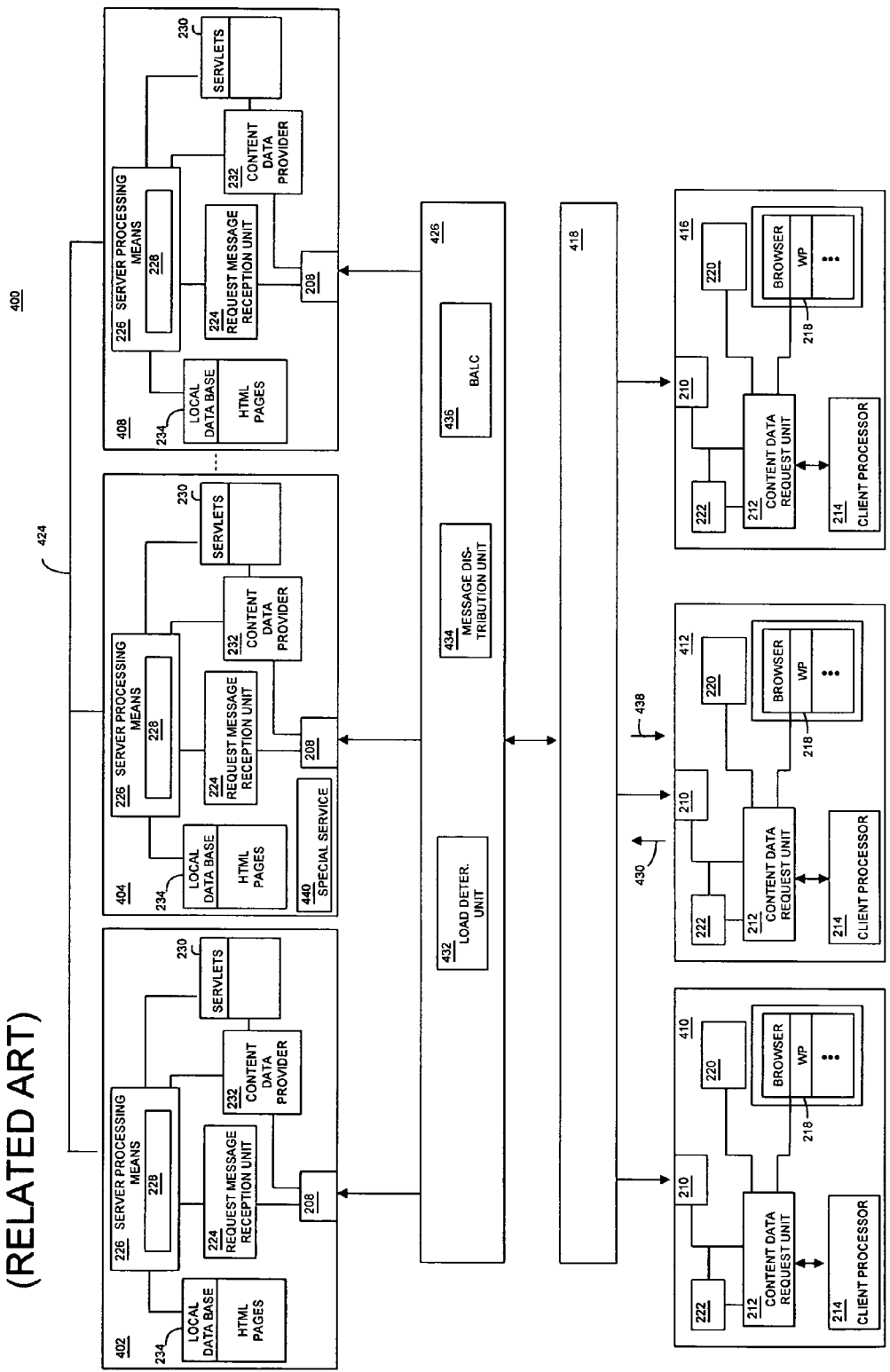
Figure 10:
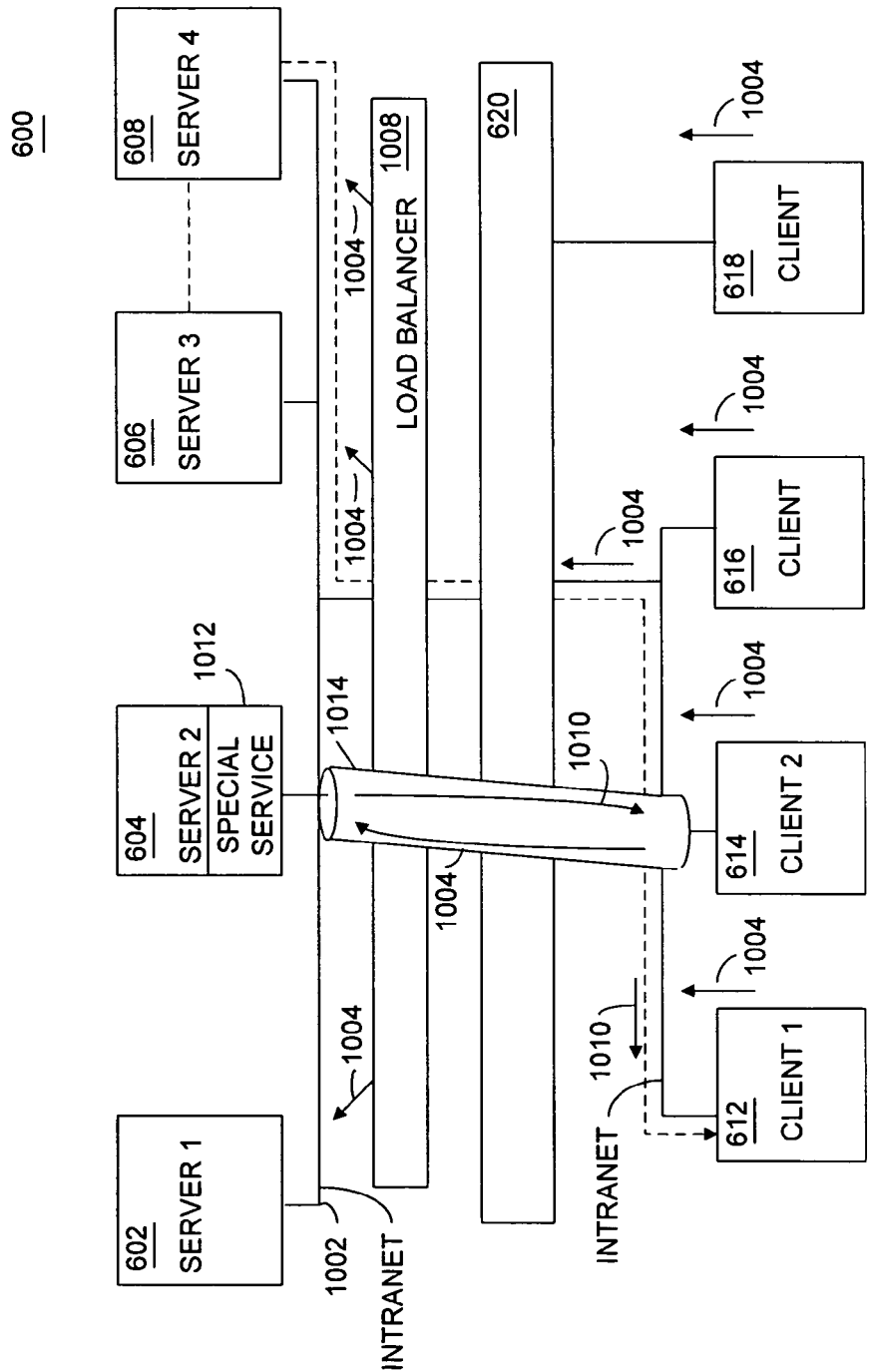
FIG. 10 depicts the block diagram of FIG. 6 in more detail.

Referring to FIG. 10, FIG. 10 shows a data processing system 1000 similar to the one shown in FIG. 4a but configured in accordance with methods and systems consistent with the present invention. For convenience, the same reference numbers will be used in FIG. 10 and in the following description to refer to the like parts of FIG. 6. As described above, with reference to FIG. 6, data processing system 600 comprises a plurality of servers 602–608 and a plurality of clients 612–618 that communicate through network 620. Data processing system 600 can comprise clients and servers in addition to those illustrated. The servers are connected to the network via a server intranet 1002. And clients 612–616 are connected to the network via a client intranet 1006, whereas client 618 is connected to the network without connecting through client intranet 1006. One having skill in the art will appreciate that the servers and clients can be connected to the network through alternative configurations to the one illustrated in FIG. 10.

Figure 11:
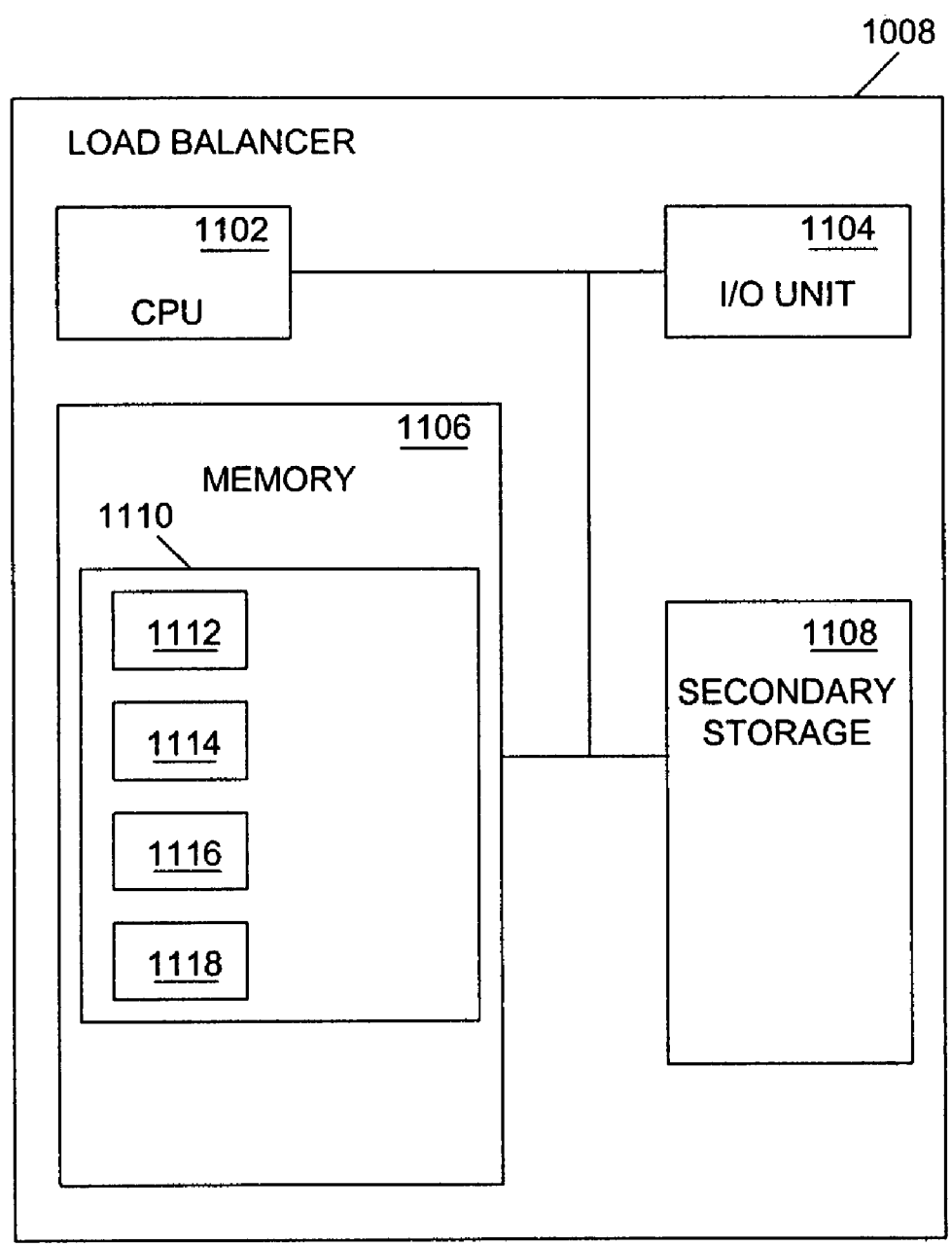
FIG. 11 depicts a block diagram of a load balancer client suitable for use with methods and systems consistent with the present invention.

Data processing system 600 also comprises a load balancer 1008. Referring to FIG. 11, FIG. 11 depicts a more detailed illustration of load balancer 1008. The load balancer comprises a central processing unit (CPU) 1102, an input output I/O unit 1104, a memory 1106, and a secondary storage device 1108. The load balancer may further comprise a video display and standard input devices such as a keyboard, a mouse or a speech processing means (each not illustrated).

Memory 1106 contains a load balancer program 1110 for performing the load balancing functionality. The load balancer program has a load determining code portion 1112 for determining the processing loads of the servers, a message distribution code portion 1114 for distributing messages to the servers, an evaluation code portion 1116 for evaluating messages, and a tunneling code portion 1118 for maintaining a tunnel through the load balancer between a client and a server. The load balancer program and its code portions will be described in more detail below.

Referring back to FIG. 10, as will be described in more detail below, clients 612–618 output content data request messages 1004 to be directed to one or more servers 602–608. The content data request messages can be, for example, requests for web page data. In response to content data request messages 1004, the servers return content data provision messages 1010 including the content data (e.g., web page data) requested by the content data request messages 1004. The load balancer is provided for distributing the content data request messages to the individual servers dependent on the processing loads at the servers as determined by the load balancer. For standard content data request messages, the load balancer operates with its intended purpose, namely it distributes the content data request messages to the individual servers dependent on their processing load.

In accordance with methods and systems consistent with the present invention, however, some of the clients may run a first communication protocol and specify that traffic for a particular client is to be sent to a particular server or host. That is the client issues special content data request messages requesting content data from a special service available at a particular server. In an illustrative example depicted in FIG. 10, client 614 issues such a special content data request message requesting content data from a special service 1012 available in server 604. For illustration, client 614 uses a portalconnect™ protocol implementation for the content data request message. In order to request the special service, the request message includes a user field including a field identifying the user (i.e., the client) a field identifying the special service. The portalconnect™ protocol as a first communication protocol for content data request messages is typically a proprietary protocol and, thus, standard load balancers typically do not allow for the detection of the user field transmitted in the content data request messages. Therefore, the typical load balancers would not able to direct the content data request message to the desired host (i.e., to server 604 in the example), and instead the servers would use a back end tunneling to get the message to the desired host.

Unlike the conventional load balancer scenario, however, methods and systems consistent with the present invention provide that special content data requests, which are from a client requesting special content data from a particular server, are forwarded directly to the particular server encapsulated and delivered via a tunnel 914 without being load balanced by a load balancer. And data content provision messages are routed from the particular server to the particular client via the tunnel. That is, message exchange between the requesting client and the providing server, i.e., the special service provider, is provided through tunneling.

Referring back to the illustrative example described above, the user at client 614 wants to view an HTML web page that is located on server 604. The web browser at the client uses the portalconnect™ protocol as a first communication protocol, but the load balancer instead recognizes messages implemented in the HTTP protocol. Therefore, if the client program uses the portalconnect™ protocol to send a data content request message to server 604, as identified in the messages header, the load balancer would be able to analyze the header to send the message to server 604. Instead, the load balancer would send the message to an arbitrary server based on load balancing.

In order to overcome this disadvantage, methods and systems consistent with the present invention provide that special content data request messages of a first communication protocol are forwarded to the desired server encapsulated in a second communication protocol recognized by the load balancer and tunneled to avoid being load balanced by the load balancer. FIGS. 12, 13, and 14 depict flow diagrams illustrating exemplary steps performed by the client program, the load balancer program, and the server program, respectively, for doing this in accordance with methods and systems consistent with the present invention. The flow diagrams of FIGS. 12, 13, and 14 are described below.

FIG. 12 depicts a flow diagram 1200 illustrating exemplary steps performed by the client program for direct message exchange with a desired server in accordance with methods and systems consistent with the present invention. In FIG. 12, first, the client program prepares a content data request message that is implemented in the first communication protocol (step 1202). Referring to the above-described example, the content data request message requests HTML web page information from special service 1012 located at server 604. The content data request message is implemented in the portalconnect™ protocol and identifies the special service in a header information area of the content data request message.

In order to send the content data request message implemented in the first communication protocol directly to the desired server, the client program sets up a tunnel to the desired server by issuing a second content data request message that is implemented in the second communication protocol (step 1204). The second content data request message contains a header that identifies the client and the special service on the desired server. An example of a content data request message in the second communication protocol, that is the HTTP protocol, is as follows:

GET /s1w-pconnect/service?S1WSESSION-user_name HTTP/1.1
  Host: virtual.hosting.com:80
  User-Agent: Sun ONE webtop client v1.1
  Cookie: S1WSESSION=user_name
  Upgrade: S1WPC/1.0
  Connection: Upgrade
  Cache-Control: no-cache In the message, the special service (host) on the desired server is identified as "virtual.hosting.com." The identifier "S1WSESSION" has the value of the user's name (i.e., the client). The first time the load balancer reads the identifier "S1WSESSION" and the special service, it stores those values in its memory or in its secondary storage. Each subsequent time that the load balancer reads a message having the identifier "S1WSESSION" and the special service "virtual.hosting.com," it forwards the messages to the same server where previous messages having those values were sent before. In other words, in accordance with methods and systems consistent with the present invention, the load balancer turns off its load balancing function for subsequent messages having S1WSESSION=user_name and host=virtual.hosting.com, and instead forwards the messages to the desired server.

Thus, the header items are used in a way in which the second communication protocol, such as HTTP, could otherwise reflect a session between the client and the server, that is by sending a cookie or rewriting URLs having this header information. Using encapsulation, the typical load balancer features can be used to keep sessions maintained between the particular client and the particular server.

Also, the item "Connection: Upgrade" indicates to the desired server that future messages sent through the tunnel will be implemented in the first communication protocol.

Then, the client program determines whether it has received a return acknowledgement message from the desired server, indicating that the server understands that a tunnel between the client and the desired server should be set up (step 1206). If not, an example of a return acknowledgement messages is as follows:

HTTP/1.1 101 Switching Protocols
Set-Cookie: S1WSESSION-user_name
Upgrade: S1WPC/1.0
Connection: Upgrade
Cache-Control: no-cache In this response, the "Upgrade" and "Connection" items acknowledge to the client that future messages will be implemented in the first communication protocol, which was identified in the client's first data content request message. In the illustrative example, the tunnel is set up with the HTTP protocol, which is subsequently used for encapsulating content data requests having the first communication protocol.

If the client program determines in step 1206 that a return acknowledgement message has been received, then the client program encapsulates the content data request message of the first communication protocol in the second communication protocol (step 1208). Future messages will be routed to the desired server and client without undergoing load balancing. That is, a tunnel has been established.

The client program encapsulates the future messages of the first communication protocol in the second communication protocol, so that the load balancer can again read the "S1WSESSION=user_name" and "virtual.hosting.com" items in the second communication protocol messages and, thus, tunnel the future messages to the desired server. Such layering of protocols is known to one having skill in the art as "encapsulation." Encapsulation and tunneling are known to one having skill in the art and will not be described in more detail herein. Encapsulation, de-encapsulation, and tunneling are described, for example, in Richard Stevens, "TCP/IP Illustrated", ISBN 0201633469, Feb. 1, 1994, which is incorporated herein by reference.

After the content data request message has been encapsulated in step 1208, the client program sends the encapsulated message to the desired server (step 1210). Since the tunnel has been established, the message travels via the load balancer to the desired server without undergoing load balancing.

Accordingly, the server receives the encapsulated data content request message and returns the desired content data, in a data content provision message, through the tunnel, where it is received by the client (step 1212). The returned content data is also encapsulated in the second communication protocol, and is thus de-encapsulated by the client program after it is received. In the above-described example, the returned data content includes HTML web page data for the web page selected by the user using the browser on the client. Once the content data is de-encapsulated, the browser can then display the web page on the client display device.

The client program then determines whether there are further data content requests for the special service (step 1214). If the client program determines that there are further such data content requests in step 1214, such as if the client wants to view additional web page information from virtual.hosting.com, then program flow returns to step 1208 to encapsulate the request messages. If the client program determines that there are no further such requests in step 1214, the tunnel is no longer needed and the client program sends a message to the server indicating to tear down the tunnel (step 1216). In response to this message, the server returns an acknowledgement message that the tunnel is being torn down, which acknowledgement message is received by the client program (step 1218). The tunnel is torn down at this point, meaning that the client does not send further encapsulated messages for the special service.

After the tunnel is torn down in step 1218 or if the client does not receive a return acknowledgement message in step 1206, then the client program ends.

The flowchart of FIG. 12 illustrates that a message is first sent by the client to set up the tunnel and then another message contains an encapsulated message requesting content data. One having skill in the art will appreciate that the first message can also contain an encapsulated request for content data. In other words, the client and server can set up the tunnel and exchange content-data-related messages, in the first message. This is as opposed to waiting for another message to exchange content-data-related messages.

FIG. 13 depicts a flow diagram 1300 illustrating exemplary steps performed by the load balancer program for direct message exchange between a particular client and a particular server in accordance with methods and systems consistent with the present invention. In FIG. 13, first, the load balancer program receives the content data request message from the client (step 1302). The content data request message is received from the client, for example, in accordance with step 1204 of FIG. 12.

As described above with reference to step 1204 of FIG. 12, the content data request message is implemented in the second communication protocol, e.g., HTTP, which is a protocol that the load balancer program can analyze. The load balancer program attempts to analyze the content data request message regardless of the message's protocol implementation (step 1304). This analysis comprises reading the message's header information to identify whether the request is for a special service. That is, the load balancer program identifies whether the message requests content data from a special service on one of the servers. As described above with reference to FIG. 12, the load balancer program makes this determination by identifying the name of the special service and the user identification in the message's header. So, referring back to the illustrative example, the load balancer program determines that message requests a special service by reading the "S1WSESSION=user_name" and "virtual.hosting.com" items in the message. The load balancer program is able to read these items because the request message is implemented in a protocol the load balancer program can read, the HTTP protocol.

Upon analyzing the content data request message, the load balancer program determines whether the request is for a special service (step 1306). If the load balancer program cannot read the request message header, for example if the request message is implemented in a protocol that the load balancer program cannot read, then it will determine that the request message is not requesting a special service.

If the load balancer program determines that the content data request message does not request a special service in step 1306, then the load balancer selects the destination server based on typical load balancing of the servers (step 1308). Load balancing is known to one having skill in the art and is not described in more detail herein. If the load balancer program, however, determines that the content data request message requests a special service in step 1306, then the load balancer selects the server that has the special service as the destination server for the content data request message (step 1310).

Then, the load balancer program forwards the content data request message to the selected server (step 1312). The server processes the forwarded message, as described above with reference to step 1206 of FIG. 14, and returns the content data provision message to the load balancer for forwarding to the client (step 1314). The load balancer program accordingly forwards the return message to the client (step 1316). This ends one message exchange between the client and server, and thus the load balancer program will determine whether there are any more content data request messages from the client (1318).

If the load balancer program determines that there are more content data request messages in step 1318, then program flow returns to step 1302, otherwise the load balancer program ends.

FIG. 14 depicts a flow diagram 1400 illustrating exemplary steps performed by the server program for direct message exchange with the client via the load balancer in accordance with methods and systems consistent with the present invention. In FIG. 14, first, the server program the content data request message from the client via the load balancer (step 1402). The content data request message is received from the client, for example, in accordance with step 1204 of FIG. 12 and step 1312 of FIG. 13.

The server program determines whether the received message requests to set up a tunnel (step 1404). As described above with reference to step 1204 of FIG. 12, the message will indicate that it requests to set up a tunnel by containing a header that identifies a special service on the desired server. If the server program determines that it is to set up a tunnel in step 1404, then the server program prepares and sends an acknowledgement message to the client via the load balancer (step 1406). A sample acknowledgement message is described above with reference to step 1204 of FIG. 12.

If the server program determines, in step 1404, that a tunnel is not to be set up, then the server program determines whether a tunnel is to be torn down responsive to the content data request message (step 1408). As described above with reference to step 1216 of FIG. 12, the server program receives a data content request message to tear down the tunnel when the client is finished with the special service on the server. If the server program determines that the tunnel is to be torn down in step 1408, then the server program, for example, frees-up the special service for other users (step 1410). Accordingly, the server program sends an acknowledgement message to the client via the load balancer indicating in the content data that the server acknowledges that the tunnel is to be torn down (step 1412).

On the other hand, if the server program determines that a tunnel is not to be torn down, the server program retrieves the requested content data, for example, from the server's memory or secondary storage (step 1414). The content data can also be retrieved from another location, such as another server or a remote storage device. In addition to retrieving the content data, the server program can execute the special service that is present on the server for the client. In the illustrative example, the retrieved content data relates to an HTML web page.

Once the content data has been retrieved, the server program creates a content data provision message and encapsulates the message in the second communication protocol (step 1416). Then, the server program sends the encapsulated content data provision message to the client via the load balancer (step 1418). In addition to the illustrative content data request and provision messages that are described above, one having skill in the art will appreciate that other types of messages can be encapsulated and exchanged between the client and the server through the tunnel. For example, messages can be exchanged through the tunnel to maintain the tunnel.

After the server program has sent the return message in steps 1406, 1412, or 1418, the server program determines whether there are any more content data request messages from the client (step 1420). If there are, then the program returns to step 1402 to receive the next content data request message. Otherwise, the server program ends.

Therefore, while load balancers cannot typically inspect content data request messages that are not implemented in a protocol that the load balancer can read, methods and systems consistent with the present invention allow the load balancers to make such an inspection by encapsulating the messages in a protocol that the load balancers can read. Accordingly, the load balancer can route the messages to the desired servers instead of routing the messages based on load balancing.

The foregoing description of an implementation of the invention has been presented for purposes of illustration and description. It is not exhaustive and does not limit the invention to the precise form disclosed. Modifications and variations are possible in light of the above teachings or may be acquired from practicing the invention. For example, the described implementation includes software but the present implementation may be implemented as a combination of hardware and software or hardware alone. The invention may be implemented with both object-oriented and non-object-oriented programming systems. The scope of the invention is defined by the claims and their equivalents.

What is claimed:

1. A method in a data processing system having a client, and a load balancer performing load balancing functionality, for a plurality of servers, the client having a client program, the method comprising the steps performed by the client program of:
generating a message indicating to the load balancer to bypass performing the load balancing functionality of distribution messages to the plurality of servers, and indicating a selected one of the servers to receive the message; and
sending the message to the load balancer, whereupon the load balancer bypasses performing load balancing functionality and sends the message directly to the selected server indicated in the message.

2. The method of claim 1, wherein the message is implemented in a first protocol, and wherein the method further comprises the step of:
encapsulating the message in a second protocol different than the first protocol prior to sending the message.

3. The method of claim 2, wherein the second protocol is the HTTP protocol.

4. The method of claim 2, wherein the message has a request for content data from the selected server.

5. The method of claim 1, wherein the message is implemented in a first protocol; and wherein the method further comprises the step of:
sending a second message implemented in a second protocol encapsulated in the first protocol, the second message having a request for a content data from the selected server.

6. The method of claim 1, further comprising the step of:
receiving a return message from the selected server.

7. The method of claim 6, wherein the return message includes content data from the selected sewer.

8. The method of claim 7, wherein the content data is web page data.

9. The method of claim 6, wherein the return message acknowledges that the load balancing functionality is bypassed.

10. The method of claim 1, wherein the message includes at least one of a client identifier and a selected sewer identifier.

11. A computer-readable storage medium containing instructions that cause a client program on a client to perform a method, the client being in a data processing system having the client, and a load balancer performing a load balancing functionality, for a plurality of servers, the method performed by the client program comprising the steps of:
generating a message indicating to the load balancer to bypass performing the load balancing functionality of distribution messages to the plurality of servers, and indicating a selected one of the servers to receive the message; and
sending the message to the load balancer, whereupon the load balancer bypasses performing load balancing functionality and sends the message directly to the selected server indicated in the message.

12. The computer-readable storage medium of claim 11, wherein the message is implemented in a first protocol, and wherein the method further comprises the step of:
encapsulating the message in a second protocol different than the first protocol prior to sending the message.

13. The computer-readable storage medium of claim 12, wherein the second protocol is the HTTP protocol.

14. The computer-readable storage medium of claim 12, wherein the message has a request for content data from the selected server.

15. The computer-readable storage medium of claim 11, wherein the message is implemented in a first protocol; and wherein the method further comprises the step of:
sending a second message implemented in a second protocol encapsulated in the first protocol, the second message having a request for a content data from the selected server.

16. The computer-readable storage medium of claim 11, further comprising the step of:
receiving a return message from the selected server.

17. The computer-readable storage medium of claim 16, wherein the return message includes content data from the selected server.

18. The computer-readable storage medium of claim 17, wherein the content data is web page data.

19. The computer-readable storage medium of claim 16, wherein the return message acknowledges that the load balancing functionality is bypassed.

20. The computer-readable storage medium of claim 11, wherein the request includes at least one of a client identifier and selected server identifier.

21. A client data processing system comprising:
a memory comprising a program that generates a message indicating to a load balancer to bypass performing a load balancing functionality of distribution messages to the plurality of servers at the load balancer, and indicating a selected one of a plurality of servers to receive the message, and
sends the message to the load balancer, whereupon the load balancer bypasses performing load balancing functionality and sends the message directly to the selected server indicated in the message; and
processing unit that runs the program.

22. A client data processing system comprising:
means for generating a message indicating to a load balancer to bypass performing a load balancing functionality of distribution messages to the plurality of servers at the load balancer, and indicating a selected one of a servers to receive the message; and
means for sending the message to the load balancer, whereupon the load balancer bypasses performing load balancing functionality and sends the message directly to the selected server indicated in the message.

23. A method in a data processing system having a client, and a load balancer performing a load balancing functionality, for a plurality of servers, the load balancer having a load balancer program, the method comprising the steps performed by the load balancer program of:
receiving a message from the client;
determining whether the message indicates to the load balancer to bypass performing the load balancing functionality of distribution messages to the plurality of servers by indicating a selected one of the servers to receive the message;
when the message does not indicate the selected server to receive the message, sending the message to a determined one of the servers based on the load balancing functionality; and
when the message indicates the selected server, bypassing the load balancing functionality and sending the message directly to the selected server indicated in the message.

24. The method of claim 23, wherein the load balancer can analyze messages of a first protocol, and wherein the message is received in a second protocol encapsulated in the first protocol.

25. The method of claim 24, wherein the second protocol is the HTTP protocol.

26. The method of claim 23, wherein the message includes a request for content data from the selected server.

27. The method of claim 23, further comprising the steps of:
receiving a return message from the selected server; and
sending the return message to the client.

28. The method of claim 27, wherein the return message includes content data from the selected server.

29. The method of claim 28, wherein the content data is web page data.

30. The method of claim 27, wherein the return message acknowledges that the message was sent to the selected server.

31. The method of claim 23, wherein the message includes at least one of a client identifier and a selected server identifier.

32. A computer-readable storage medium containing instructions that cause a load balancer program on a load balancer to perform a method, the load balancer being in a data processing system having a client, and the load balancer performing a load balancing functionality, for a plurality of servers, the method performed by the load balancer program comprising the steps of:
receiving a message from the client;
determining whether the message indicates to the load balancer to bypass performing the load balancing functionality of distribution messages to the plurality of servers by indicating a selected one of the servers to receive the message;
when the message does not indicates the selected server to receive the message, sending the message to determined one of the servers based on the load balancing functionality; and
when the message indicates the selected server, bypassing the load balancing functionality and sending the message directly to the selected server indicated in the message.

33. The computer-readable storage medium of claim 32, wherein the load balancer can analyze messages of a first protocol, and wherein the message is received in a second protocol encapsulated in the first protocol.

34. The computer-readable storage medium of claim 33, wherein the second protocol is the HTTP protocol.

35. The computer-readable storage medium of claim 32, wherein the message includes a request for content data from the selected server.

36. The computer-readable storage medium of claim 32, further comprising the steps of:
receiving a return message from the selected server; and
sending the return message to the client.

37. The computer-readable storage medium of claim 36, wherein the return message includes content data from the selected server.

38. The computer-readable storage medium of claim 37, wherein the content data is web page data.

39. The computer-readable storage medium of claim 36, wherein the return message acknowledges that the message was sent to the selected server.

40. The computer-readable storage medium of claim 32, wherein the message includes at least one of a client identifier and a selected server identifier.

41. A load balancer comprising:
a memory comprising a program that receives a message from a client, determines whether the message indicates to the load balancer to bypass performing a load balancing functionality of distribution messages to a plurality of servers by indicating a selected one of a plurality of servers to receive the message, sends the message to a determined one of the servers based on a load balancing functionality when message does not indicate the selected server to receive the message, and bypasses load balancing functionality and sends the message directly to the selected server when the message indicates the selected server; and
a processing unit that runs the program.

* * * * *